United States Patent
Shimono et al.

(10) Patent No.: US 12,319,019 B2
(45) Date of Patent: Jun. 3, 2025

(54) FIBER-REINFORCED COMPOSITE MATERIAL MOLDING APPARATUS AND FIBER-REINFORCED COMPOSITE MATERIAL MOLDING METHOD

(71) Applicant: MITSUBISHI HEAVY INDUSTRIES, LTD., Tokyo (JP)

(72) Inventors: Kodai Shimono, Tokyo (JP); Hiroshi Tokutomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 184 days.

(21) Appl. No.: 17/787,530

(22) PCT Filed: Mar. 25, 2021

(86) PCT No.: PCT/JP2021/012644
§ 371 (c)(1),
(2) Date: Jun. 20, 2022

(87) PCT Pub. No.: WO2022/201453
PCT Pub. Date: Sep. 29, 2022

(65) Prior Publication Data
US 2023/0339195 A1   Oct. 26, 2023

(51) Int. Cl.
*B29C 70/54* (2006.01)
*B29C 70/44* (2006.01)

(52) U.S. Cl.
CPC .......... *B29C 70/548* (2013.01); *B29C 70/443* (2013.01); *B29C 70/446* (2013.01)

(58) Field of Classification Search
CPC ... B29C 70/548; B29C 70/443; B29C 70/342; B29C 70/446
See application file for complete search history.

(56) References Cited

U.S. PATENT DOCUMENTS 10,232,568 B2 * 3/2019 Bendel ................... F01D 5/147
10,807,324 B2 * 10/2020 Evans ................... B29C 70/548
(Continued)

FOREIGN PATENT DOCUMENTS

JP         H11254566 A       9/1999
JP         2004181627 A      7/2004

*Primary Examiner* — Michael A Tolin
*Assistant Examiner* — Hana C Page
(74) *Attorney, Agent, or Firm* — HAUPTMAN HAM, LLP

(57) ABSTRACT

A fiber-reinforced composite material molding apparatus includes a molding die, a bagging film that seals a fiber base material in the molding die to form a hermetically sealed space, an intake line that depressurizes the hermetically sealed space, and a resin injection line that injects a resin material into the fiber base material. The molding die includes a main body portion including a main groove that extends along a longitudinal direction and is connected to the resin injection line, lateral grooves that are formed at a plurality of positions in the longitudinal direction and extend along a width direction, and a step portion that extends along the longitudinal direction and is disposed between the main groove and the lateral grooves, and a lid portion that extends along the longitudinal direction, is disposed being in contact with the step portion to cover the main groove, and forms a part of a molding surface. The main body portion includes a communication groove through which the main groove is communicated with the lateral grooves.

3 Claims, 18 Drawing Sheets

(56) References Cited

U.S. PATENT DOCUMENTS

| | | |
|---|---|---|
| 2006/0125155 A1 | 6/2006 | Sekido et al. |
| 2008/0044506 A1* | 2/2008 | Zahlen .................. B29C 70/548 425/130 |
| 2019/0152167 A1 | 5/2019 | Evans et al. |

* cited by examiner

FIBER-REINFORCED COMPOSITE MATERIAL MOLDING APPARATUS AND FIBER-REINFORCED COMPOSITE MATERIAL MOLDING METHOD

RELATED APPLICATIONS

The present application is a National Phase of International Application Number PCT/JP2021/012644 filed Mar. 25, 2021.

TECHNICAL FIELD

The present disclosure relates to a fiber-reinforced composite material molding apparatus and a fiber-reinforced composite material molding method.

BACKGROUND ART

A fiber-reinforced composite material such as fiber-reinforced plastic obtained by reinforcing resin using a fiber base material including glass fibers, carbon fibers, and the like has been known (see, for example, Patent Document 1). Patent Document 1 discloses a molding method for a fiber-reinforced composite material, employing resin transfer molding (RTM) in which the difference in pressure between a vacuum and the atmosphere is used to facilitate impregnation of resin in a fiber base material. In Patent Document 1, a core material, which is a molding die for forming a composite material, has a large groove serving as a resin passage and a large number of small grooves branched from the large groove. Resin is diffused in a surface direction of the reinforcing fiber base material through the large groove and the small grooves, and the resin diffused is impregnated in a thickness direction of the reinforcing fiber base material.

CITATION LIST

Patent Literature

Patent Document 1: Japanese Unexamined Patent Application Publication No. H11-254566A

SUMMARY OF INVENTION

Technical Problem

Unfortunately, the molding method disclosed in Patent Document 1 may fail to mold a composite material having a desired shape, because the fiber base material is disposed to cover the large groove, and a portion of the fiber base material covering the large groove deforms along the shape of the large groove.

The present disclosure is made in view of such circumstances, and an object of the present disclosure is to provide a fiber-reinforced composite material molding apparatus and a fiber-reinforced composite material molding method with which a resin material can be diffused in a surface direction of a fiber base material and impregnated into the entirety of the fiber base material, without deforming the fiber base material.

Solution to Problem

A fiber-reinforced composite material molding apparatus according to one aspect of the present disclosure includes a molding die having a molding surface on which a fiber base material is disposed, the molding surface extending along a first direction, a hermetically sealing member that seals the fiber base material in the molding die to form a hermetically sealed space, an intake part that intakes air in the hermetically sealed space to depressurize the hermetically sealed space, and a resin injection part that injects a resin material into the fiber base material sealed in the hermetically sealed space depressurized by the intake part. The molding die includes a main body portion including a first groove portion that extends along the first direction and is connected to the resin injection part, second groove portions that are formed at a plurality of positions in the first direction and extend along a second direction crossing the first direction, and a step portion that extends along the first direction and is disposed between the first groove portion and the second groove portions, and a lid portion that extends along the first direction, is disposed being in contact with the step portion to cover the first groove portion, and forms a part of the molding surface. Either the main body portion or the lid portion includes a communication groove through which the first groove portion is communicated with the second groove portions.

A fiber-reinforced composite material molding method according to one aspect of the present disclosure is for molding a composite material by using a molding die. The molding die includes a main body portion including a first groove portion that extends along a first direction, second groove portions that are formed at a plurality of positions in the first direction and extend along a second direction crossing the first direction, and a step portion that extends along the first direction and is disposed between the first groove portion and the second groove portions, and a lid portion that extends along the first direction, is disposed being in contact with the step portion to cover the first groove portion, and forms a part of a molding surface. Either the main body portion or the lid portion includes a communication groove through which the first groove portion is communicated with the second groove portions. The fiber-reinforced composite material molding method includes a disposing step of disposing a fiber base material on the molding surface, a hermetically sealing step of sealing the fiber base material in the molding die by using a hermetically sealing member to form a hermetically sealed space, and an injecting step of intaking air in the hermetically sealed space formed by the hermetically sealing step to depressurize the hermetically sealed space and injecting a resin material into the first groove portion.

Advantageous Effects of Invention

The present disclosure can provide a fiber-reinforced composite material molding apparatus and a fiber-reinforced composite material molding method with which a resin material can be diffused in a surface direction of a fiber base material and impregnated into the entirety of the fiber base material, without deforming the fiber base material.

DESCRIPTION OF EMBODIMENTS

First Embodiment

Figure 1:
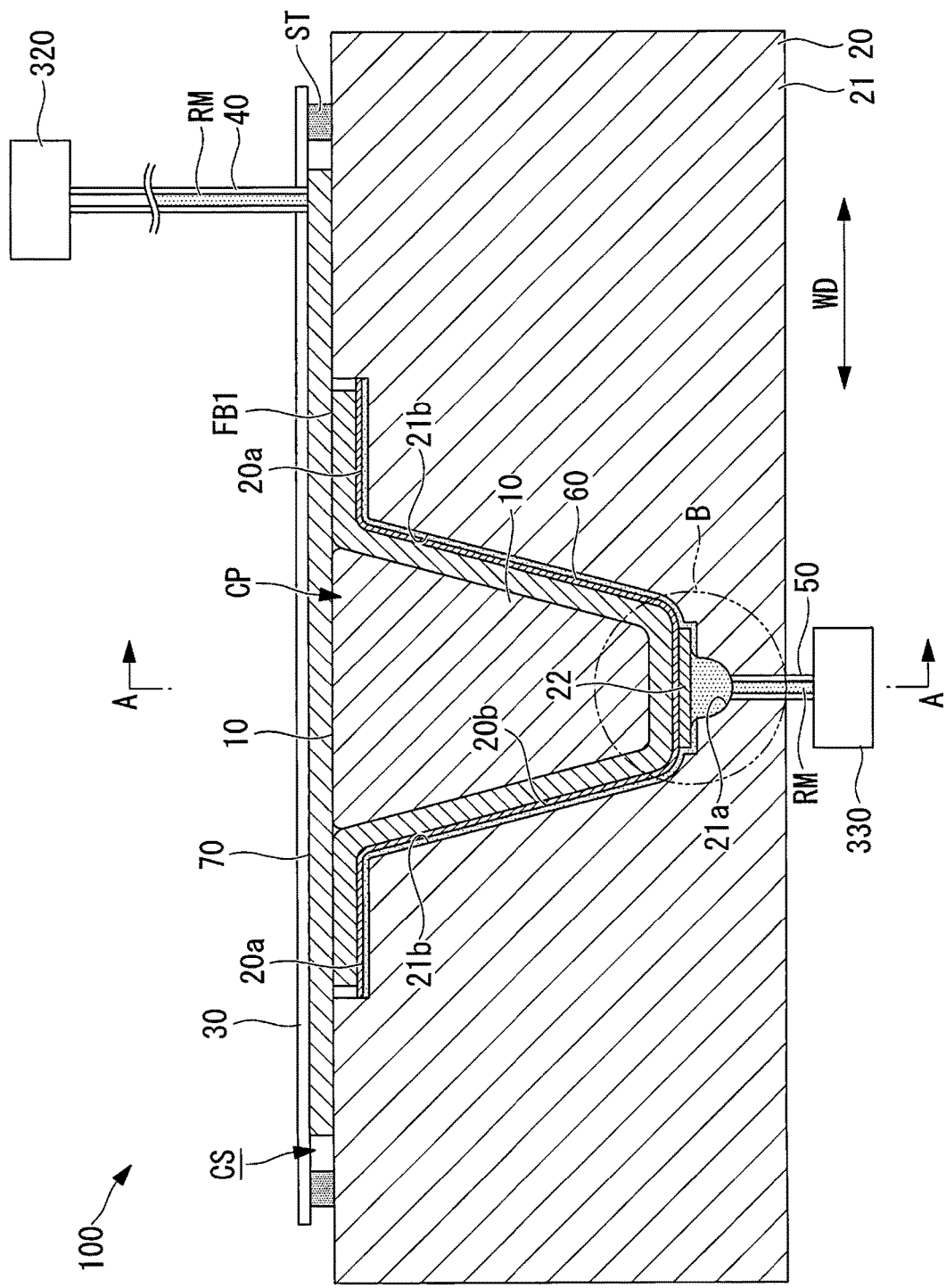
FIG. 1 is a horizontal cross-sectional view illustrating a molding apparatus according to a first embodiment of the present disclosure, and is a horizontal cross-sectional view taken at a position where a lateral groove is formed in a molding die.

A molding apparatus (fiber-reinforced composite material molding apparatus) 100 and a fiber-reinforced composite material molding method using the same according to a first embodiment of the present disclosure will be described below with reference to the drawings. FIG. 1 is a horizontal cross-sectional view illustrating the molding apparatus 100 according to the first embodiment of the present disclosure, and is a horizontal cross-sectional view taken at a position where a lateral groove 21b is formed in a molding die 20.

Figure 2:
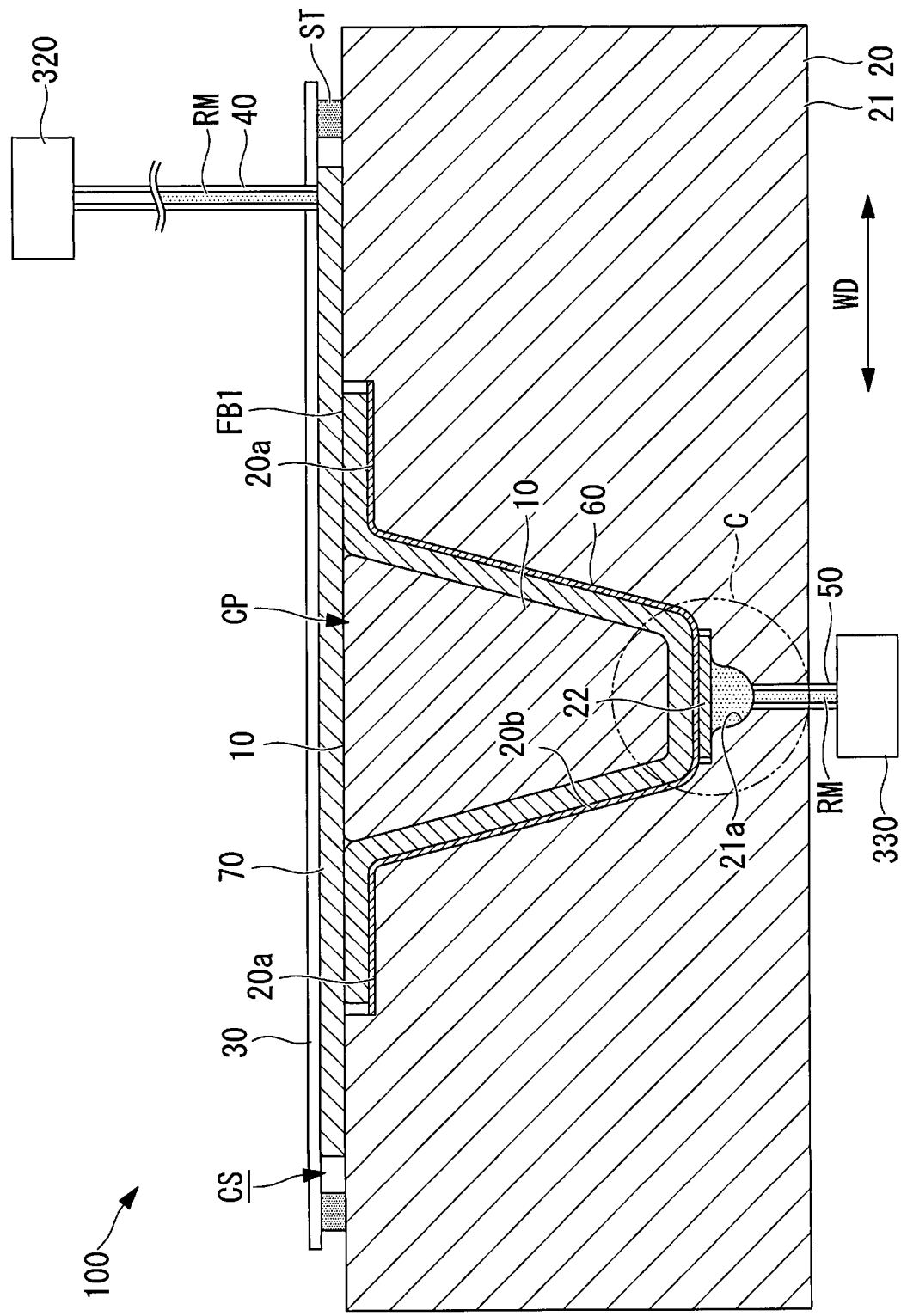
FIG. 2 is a horizontal cross-sectional view illustrating the molding apparatus according to the first embodiment of the present disclosure, and is a horizontal cross-sectional view taken at a position where the lateral groove is not formed in the molding die.
Figure 3:
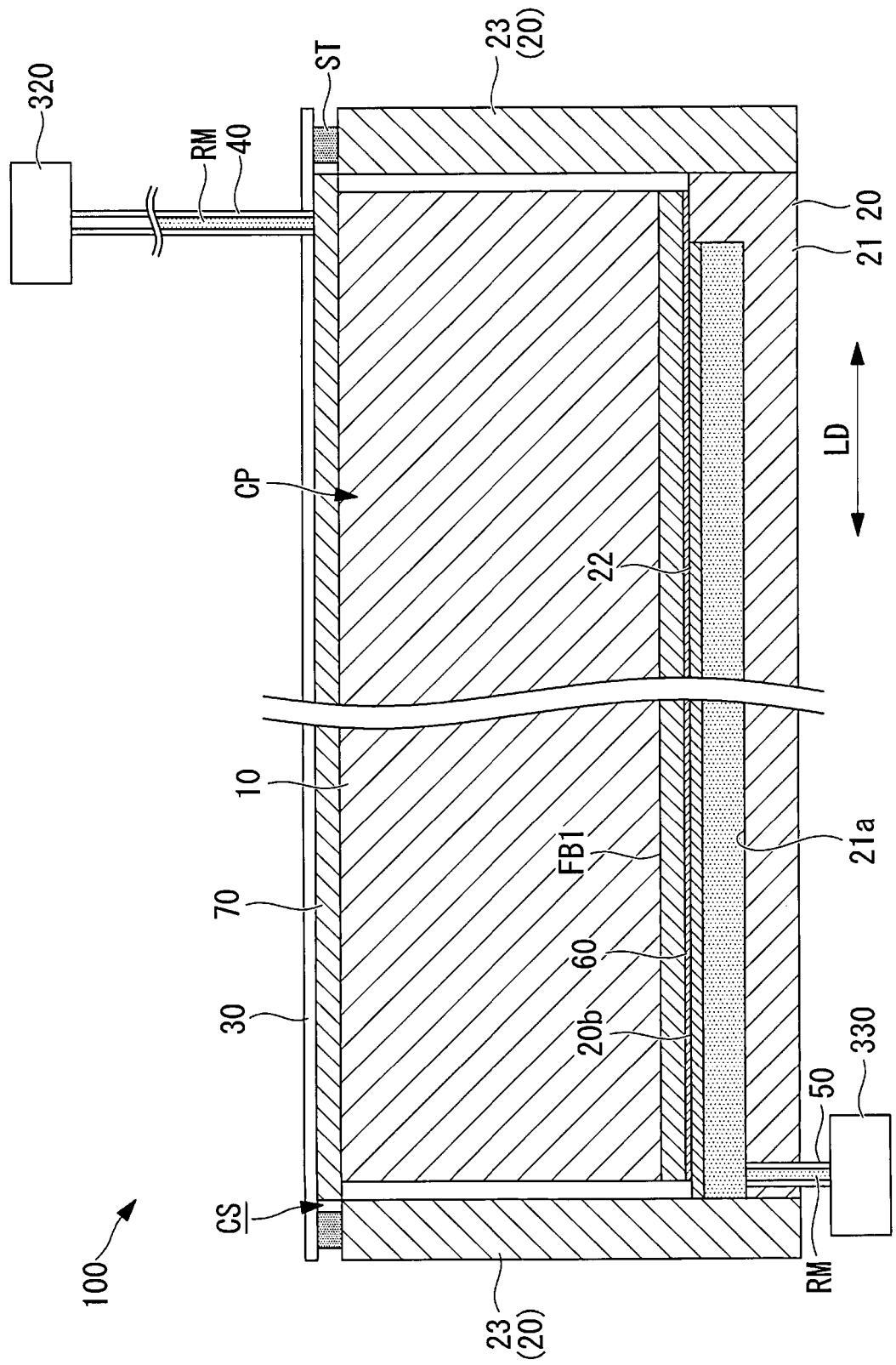
FIG. 3 is a cross-sectional view of the molding apparatus taken along line A-A illustrated in FIG. 1.
Figure 4:
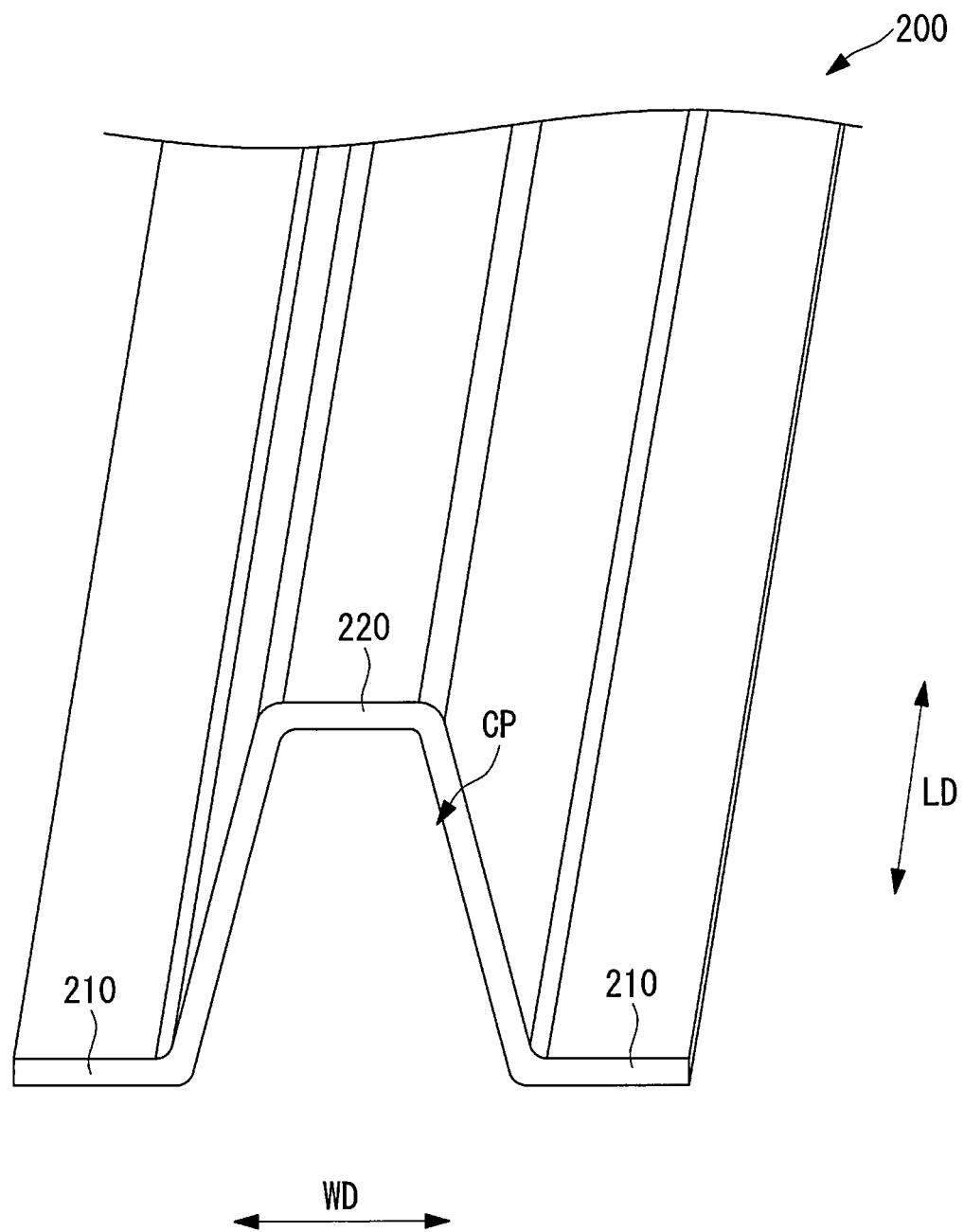
FIG. 4 is a perspective view illustrating an example of a composite material manufactured with the molding apparatus illustrated in FIG. 1.

FIG. 2 is a horizontal cross-sectional view illustrating the molding apparatus 100 according to the first embodiment of the present disclosure, and is a horizontal cross-sectional view taken at a position where the lateral groove 21b is not formed in the molding die 20. FIG. 3 is a cross-sectional view of the molding apparatus 100 taken along line A-A illustrated in FIG. 1. FIG. 4 is a perspective view illustrating an example of a composite material 200 manufactured with the molding apparatus 100 illustrated in FIG. 1.

The molding apparatus 100 according to the present embodiment is an apparatus for executing infusion molding. Specifically, a fiber base material FB1 disposed in the molding die 20 serving as a lower mold is sealed in a hermetically sealed space CS using a bagging film 30 for an upper mold. Then, a resin material RM is filled in the hermetically sealed space CS and cured by depressurizing the hermetically sealed space CS. The infusion molding is one method of resin transfer molding (RTM) and resin infusion in which the difference in pressure between a vacuum and the atmosphere is used to facilitate impregnation of resin in a fiber base material.

For example, with the molding apparatus 100 of the present embodiment, the composite material (fiber-reinforced composite material) 200 illustrated in FIG. 4 is molded. The composite material 200 illustrated in FIG. 4 is a stringer used as a reinforcement material for reinforcing an aircraft fuselage. The composite material 200 is a member that extends along a longitudinal direction (first direction) LD to be in an elongated shape, and has a center portion, in a width direction WD, protruding. The width direction (second direction) WD is a direction orthogonal to the longitudinal direction LD in a surface where the composite material 200 is placed.

As illustrated in FIG. 4, the composite material 200 includes: a pair of flat portions 210 disposed on both ends in the width direction WD and formed in a flat shape; and a protruding portion 220 that is connected to the pair of flat portions 210 and protrudes upward at the center portion in the width direction WD. The flat portions 210 and the protruding portion 220 are integrally molded using the resin material RM. The composite material 200 is obtained with the resin material RM impregnated in the fiber base material FB1 illustrated in FIGS. 1 and 2.

The fiber base material FB1 is a member in which a plurality of layers of sheets formed of a reinforcing-fiber material, such as carbon fibers or glass fibers, are stacked for example. The fiber base material FB1 may also be a prepreg impregnated with the resin material RM in advance, a prepreg partially impregnated with the resin material RM, or a combination of the prepreg and a reinforcing-fiber material. The resin material RM is, for example, a thermosetting resin material such as epoxy resin, unsaturated polyester, vinyl ester, phenol, cyanate ester, polyimide, and the like.

While the resin material RM is assumed to be the thermosetting resin material in the following description, a thermoplastic resin may also be used for example. Examples of the thermoplastic resin include polyether ether ketone (PEEK), polyethylene terephthalate (PET), polybutylene terephthalate (PBT), nylon 6 (PA6), nylon 66 (PA66), polyphenylene sulfide (PPS), polyether imide (PEI), polyether ketone (PEKK), and the like.

The composite material 200 illustrated in FIG. 4 has a recessed portion CP that is defined by the flat portions 210 and the protruding portion 220 and extends along the longitudinal direction LD. For molding the composite material 200 having the recessed portion CP, the molding apparatus 100 of the present embodiment uses a core portion 10 serving as a core to be inserted in the recessed portion CP. Molding the composite material 200 with the core portion 10 inserted in the recessed portion CP enables the certain shape of the recessed portion CP to be maintained during molding of the composite material 200.

As illustrated in FIGS. 1 to 3, the molding apparatus 100 according to the present embodiment includes the core portion 10, the molding die 20, the bagging film (hermetically sealing member) 30, an intake line (intake part) 40, a resin injection line (resin injection part) 50, and a removable resin pass medium (sheet) 60, and an intake medium 70.

The core portion 10 is a member disposed in contact with the fiber base material FB1 disposed in the molding die 20 with no gap in between. The core portion 10 is a member that has a shape corresponding to the recessed portion CP and is formed in a shape elongated in the longitudinal direction LD. The core portion 10 is a member with hardness high enough for the certain shape to be maintained even when the hermetically sealed space CS is vacuumized. The core portion 10 is formed of a foam material such as polyethylene, polypropylene, polyvinylchloride, polymethacrylate, balsa, and carbon foam. In addition, the core portion 10 is, for example, a hollow member made of rubber such as a bladder to which internal pressure is applied due to atmospheric pressure during the molding and may be formed by a material enabling the core portion 10 to be deflated through vacuum intake to be pulled out after the molding.

The molding die 20, in which the fiber base material FB1 with the core portion 10 accommodated in the recessed portion CP is disposed, is a die for molding the fiber base material FB1 into a desired shape. The molding die 20 illustrated in FIG. 1 to FIG. 3 is a female mold in which a pair of flat molding surfaces 20a and a molding surface 20b on which the fiber base material FB1 is disposed are formed. The molding surfaces 20a extend along the width direction WD. The molding surface 20b has a shape recessed downward from the molding surface 20a. The mold surfaces 20a and the mold surface 20b are each a surface on which the fiber base material FB1 is disposed and extend along the longitudinal direction LD.

Figure 5:
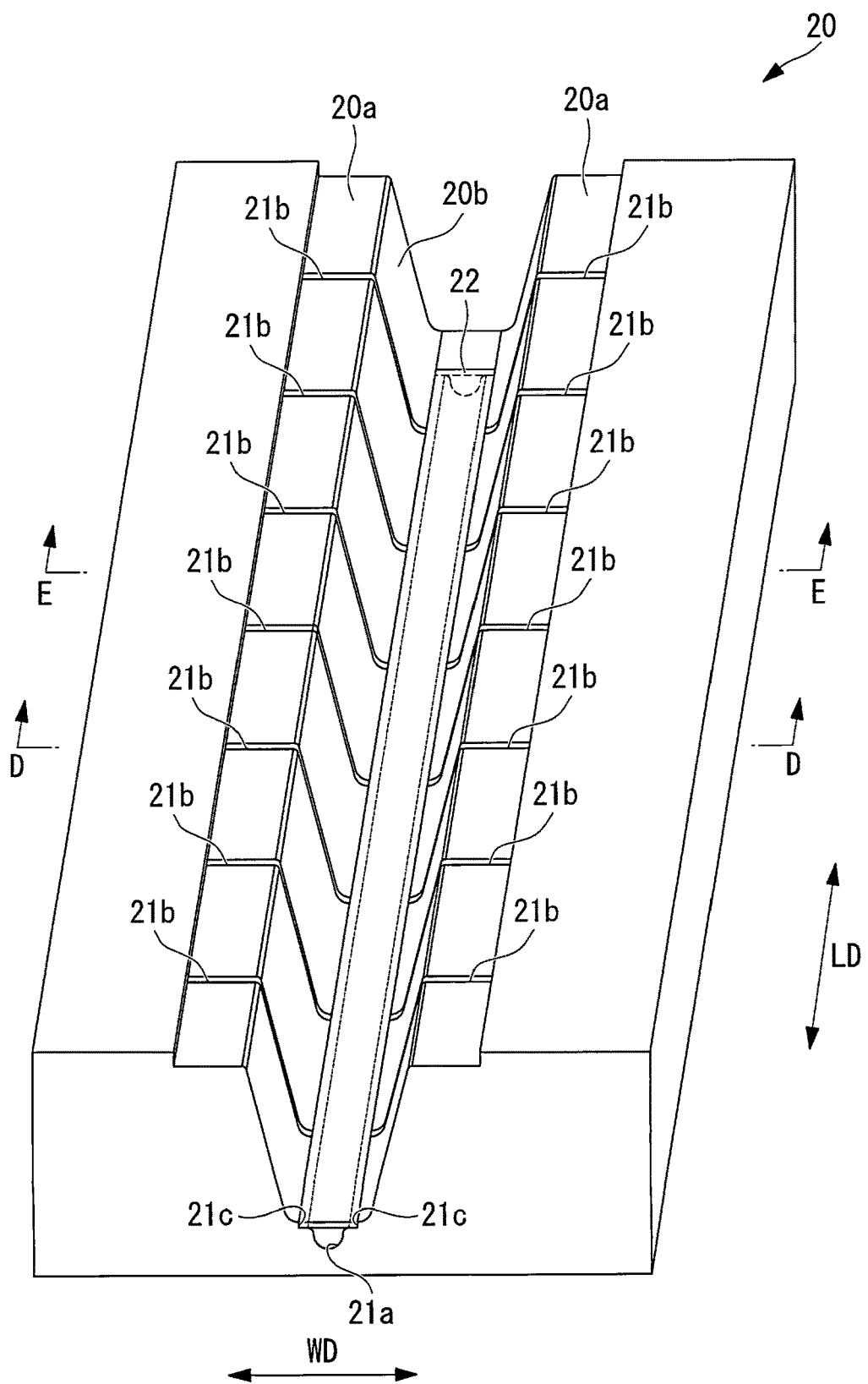
FIG. 5 is a perspective view of the molding die illustrated in FIG. 1.
Figure 6:
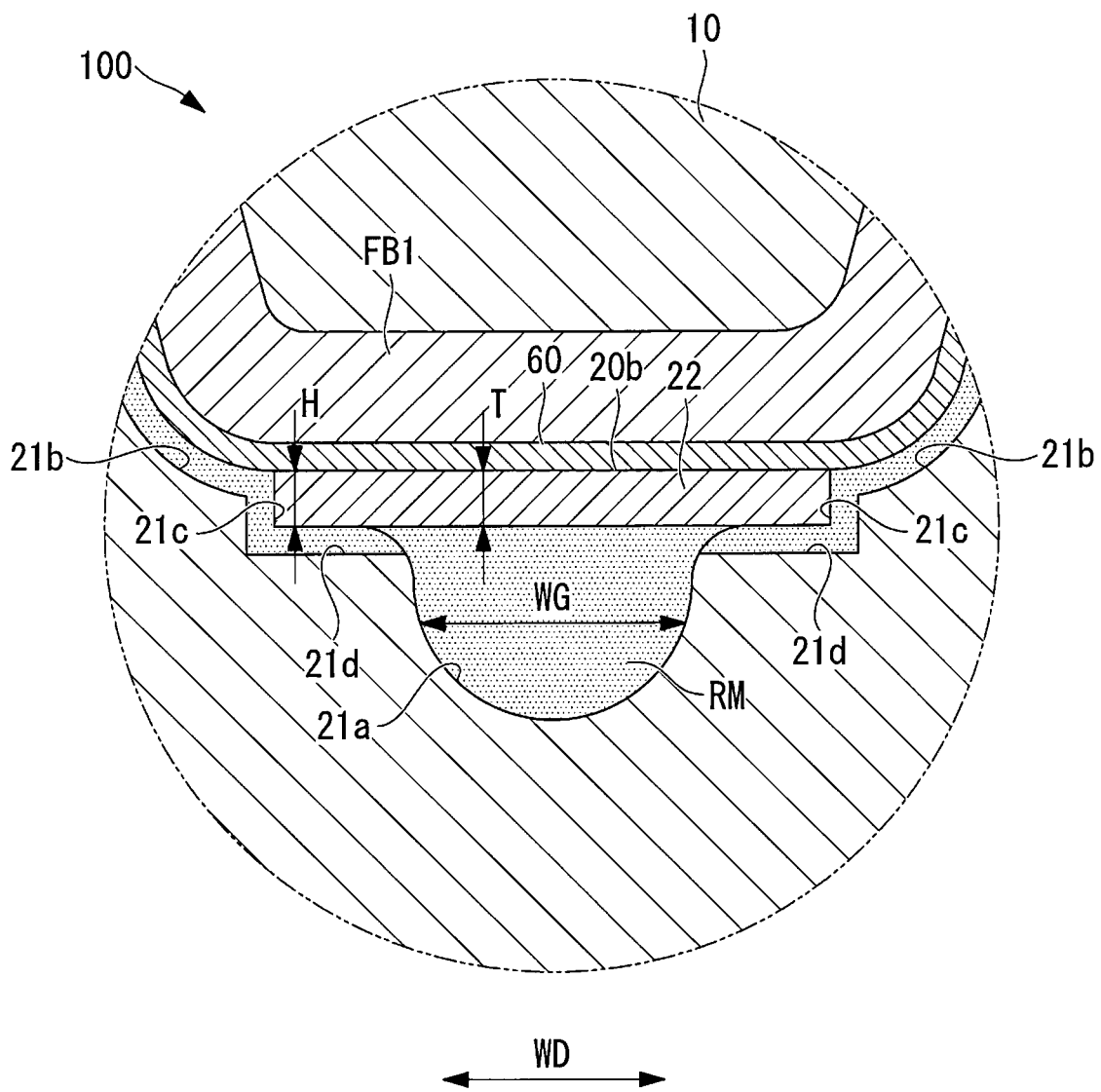
FIG. 6 is a partially enlarged view of a B part illustrated in FIG. 1.
Figure 7:
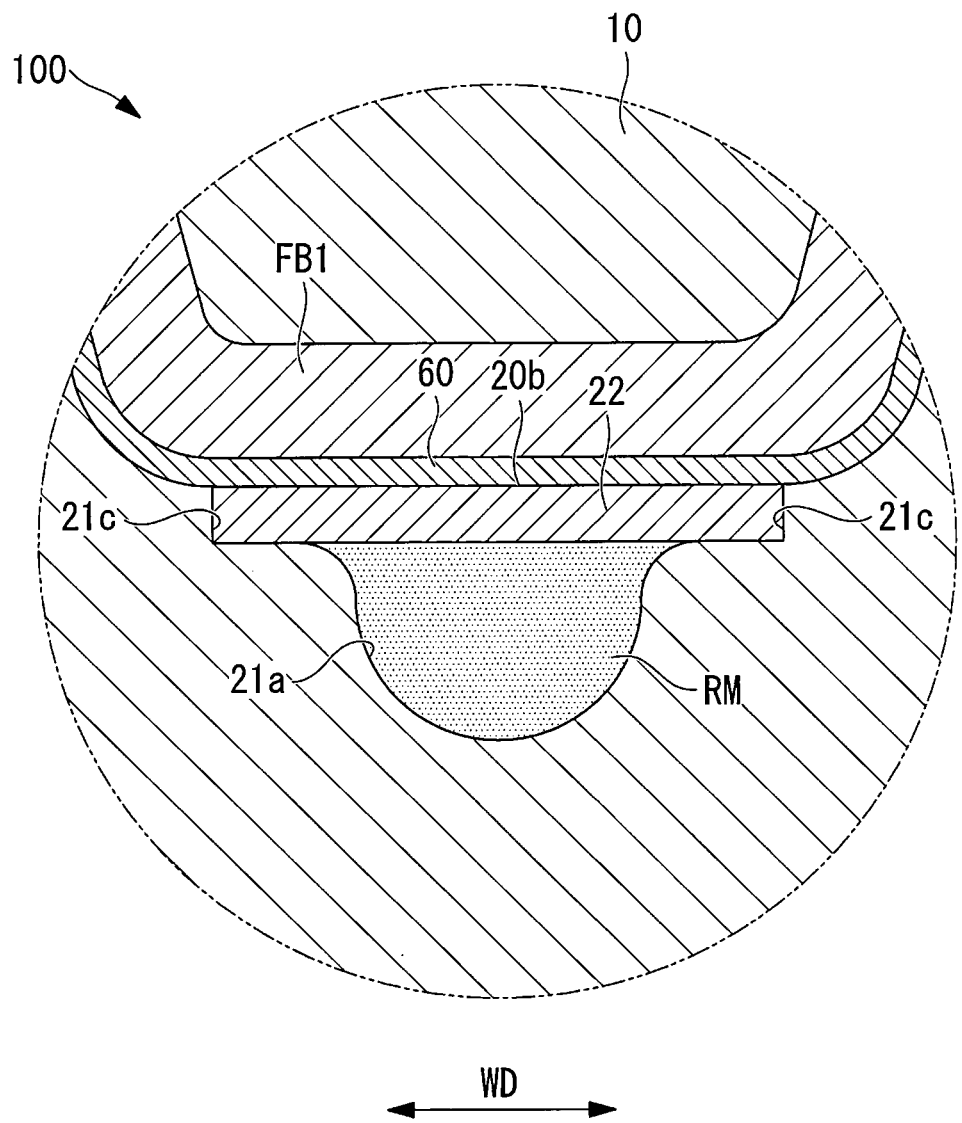
FIG. 7 is a partially enlarged view of a C part illustrated in FIG. 2.

Next, the structure of the molding die 20 for diffusing the resin material RM entirely over the surface direction of the fiber base material FB1 will be described with reference to the drawings. FIG. 5 is a perspective view of the molding die 20 illustrated in FIG. 1. FIG. 6 is a partially enlarged view of a B part illustrated in FIG. 1. FIG. 7 is a partially enlarged view of a C part illustrated in FIG. 2. The horizontal cross-sectional view illustrated in FIG. 1 is a cross-sectional view taken along line D-D in FIG. 5, passing through a position where the lateral groove 21b is formed. The horizontal cross-sectional view illustrated in FIG. 2 is a cross-sectional view taken along line E-E in FIG. 5, passing through a position where the lateral groove 21b is not formed.

As illustrated in FIG. 5, the molding die 20 includes a main body portion 21, a lid portion 22, and a pair of wall portions 23. As illustrated in FIG. 6, the main body portion 21 includes a main groove (first groove portion) 21a, the lateral groove (second groove portion) 21b, a step portion 21c, and a communication groove 21d. The main groove 21a and the lateral groove 21b are provided for diffusing the resin material RM entirely over the surface direction of the fiber base material FB1.

As illustrated in FIG. 5, the main groove 21a extends in the longitudinal direction LD from one end of (lower side in FIG. 5) to a point close the other end (upper side in FIG. 5) of the molding die 20. As illustrated in FIGS. 1 to 3, the main groove 21a is connected to the resin injection line 50. The resin material RM is supplied from the resin injection line 50 to the main groove 21a. As illustrated in FIG. 6, the main groove 21a has a shape with a groove width WG gradually decreasing toward the bottom portion.

The main groove 21a makes the resin material RM flow from one end (lower side in FIG. 5) toward the other end (upper side in FIG. 5) of the molding die 20 illustrated in FIG. 5. In FIG. 5, the length of the main groove 21a in the width direction WD is the same among positions in the longitudinal direction LD, and thus the cross-sectional area of the flow path for the resin material RM formed by the main groove 21a is the same among the positions in the longitudinal direction LD. Still, other modes may be employed.

For example, the main groove 21a may be formed in such a manner that the cross-sectional area of the flow path for the resin material RM formed by the main groove 21a gradually decreases from one end in the longitudinal direction LD close to the resin injection line 50 (lower side in FIG. 5, left side in FIG. 3) toward the other end (upper side in FIG. 5, right side in FIG. 3) of the molding die 20 in the longitudinal direction LD. With the cross-sectional area of the main groove 21a gradually decreasing from the upstream side toward the downstream side in the flow direction of the resin material RM, the amount of resin material RM remaining in the main groove 21a without being impregnated in the fiber base material FB1 can be made small.

As illustrated in FIG. 5, the lateral grooves 21b are formed at a plurality of positions in the longitudinal direction LD and extend in the width direction WD orthogonal to the longitudinal direction LD. The lateral grooves 21b extend from the end portions of the main groove 21a toward both sides in the width direction WD at the plurality of positions in the longitudinal direction LD. The lateral grooves 21b extend continuously in both the mold surfaces 20a and the mold surface 20b. The resin material RM guided from the main groove 21a to the lateral grooves 21b flows from the mold surface 20b toward the mold surfaces 20a.

Note that in the present embodiment, the lateral groove 21b extends in a direction orthogonal to the main groove 21a. Other modes may also be employed. For example, the lateral groove 21b may extend in any other direction than the direction parallel to the main groove 21a. Thus, the lateral groove 21b may extend in a direction crossing the main groove 21a (including a direction orthogonal thereto).

The flow path cross-sectional area of the flow path (first flow path) for the resin material RM formed by the main groove 21a is larger than the flow path cross-sectional area of a flow path (second flow path) formed by one lateral groove 21b. This is for making the pressure loss at the time when the resin material RM flows in the main groove 21a larger than the pressure loss at the time when the resin material RM flows in the lateral grooves 21b, to substantially equalize the amount of the resin material RM guided to the plurality of lateral grooves 21b disposed at a plurality of positions in the longitudinal direction LD.

As illustrated in FIG. 5, the step portions 21c extend along the longitudinal direction LD and are disposed between the main groove 21a and the lateral grooves 21b. The step portion 21c has a recessed shape to make the upper surface of the lid portion 22 match the mold surface 20b of the main body portion 21 disposed adjacent to the lid portion 22 in a state where the lid portion 22 is placed. As illustrated in FIG. 6, a height H of the step portion 21c match a thickness T of the lid portion 22.

The communication groove 21d is a groove through which the main groove 21a is communicated with the lateral grooves 21b. The communication grooves 21d are formed so as to extend from the end portions of the main groove 21a in the width direction WD toward the lateral grooves 21b. Through the communication groove 21d, the main groove 21a is communicated with the lateral grooves 21b in a state where the lid portion 22 is attached to the step portions 21c with lower and side surfaces of the lid portion 22 being in contact with the step portions 21c.

As illustrated in FIG. 5, the lid portion 22 is a plate member having an elongated shape that extends along the longitudinal direction LD and is disposed in a state of being in contact with the step portions 21c to cover the main groove 21a. As illustrated in FIGS. 6 and 7, in a state where the lid portion 22 is disposed on the step portions 21c, the upper surface of the lid portion 22 is flush with the mold surface 20b of the main body portion 21 disposed adjacent to the lid portion 22. The upper surface of the lid portion 22 forms a part of the molding surface 20b of the molding die 20 for molding the fiber base material FB1.

The lid portion 22 is formed to be rigid enough to be not deformed when pressed toward the main groove 21a by the fiber base material FB1, as a result of depressurizing the hermetically sealed space CS. The lid portion 22 is formed of, for example, a fluororesin material such as polytetrafluoroethylene that is heat resistant and features high rigidity. Furthermore, the lid portion 22 is preferably subjected to release treatment to be easily separable from the resin material RM cured in the main groove 21a.

As illustrated in FIG. 6, at the position where the lateral groove 21b in the longitudinal direction LD is formed, the main groove 21a and the lateral groove 21b are in communication with each other through the communication groove 21d. Thus, the resin material RM flowing in the main groove 21a flows into the lateral groove 21b through the communication grooves 21d, and is guided toward the end portions of the fiber base material FB1 in the width direction WD.

On the other hand, as illustrated in FIG. 7, at the position where the lateral groove 21b in the longitudinal direction LD is not formed, both end portions of the main groove 21a in the width direction WD are closed due to the step portions 21c and the lid portion 22 being in contact with each other. Therefore, at the position where the lateral groove 21b in the longitudinal direction LD is not formed, the entire amount of the resin material RM flows in the longitudinal direction LD.

Figure 8:
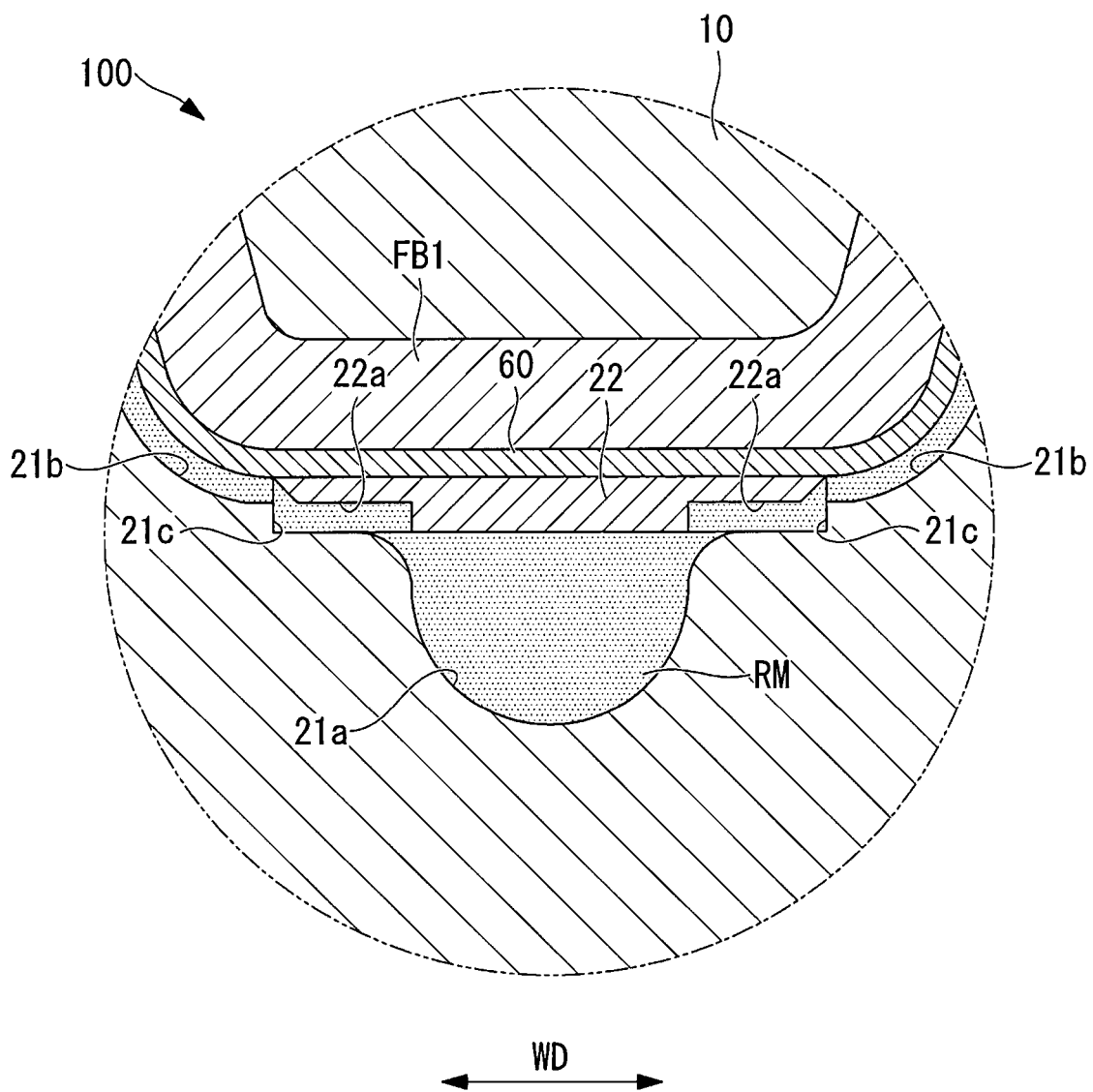
FIG. 8 is a partially enlarged view illustrating a modification example in which a lid portion has a communication groove.

In the example illustrated in FIG. 6, the main body portion 21 has the communication grooves 21d through which the main groove 21a is communicated with the lateral grooves 21b, but other aspects may be employed. For example, as illustrated in FIG. 8, the lid portion 22 may have communication grooves 22a through which the main groove 21a is communicated with the lateral grooves 21b. The communication groove 22a illustrated in FIG. 8 is formed, in the lower surface of the lid portion 22, so as to extend from the end portions of the main groove 21a in the width direction WD toward the lateral groove 21b.

As illustrated in FIG. 3, the pair of wall portions 23 are members attached to the main body portion 21 to close both ends of the main body portion 21 in the longitudinal direction LD. With both ends of the main body portion 21 in the longitudinal direction LD closed by the pair of wall portions 23 and with the upper side of the molding die 20 covered by the bagging film 30, the space in which the fiber base material FB1 is disposed can be the hermetically sealed space CS.

The communication groove 22a illustrated in FIG. 8 is formed at a plurality of positions in the longitudinal direction LD so as to correspond to the lateral grooves 21b when the lid portion 22 is disposed on the step portions 21c. Through the communication grooves 22a, the main groove 21a is communicated with the lateral grooves 21b in a state where the lid portion 22 is attached to the step portion 21c with lower and side surfaces of the lid portion 22 in contact with the step portion 21c.

The bagging film 30 is a member that forms the hermetically sealed space CS, with the fiber base material FB1 sealed in the molding die 20. The bagging film 30 is formed of, for example, a resin material including nylon as a main component. The bagging film 30 is joined, with a sealant tape ST, to the molding die 20 so as to cover the entire circumference of the molding surfaces 20a and the molding surface 20b of the molding die 20.

The intake line 40 is a tube having one end connected to an intake source 320 such as a vacuum pump and the other end connected to the hermetically sealed space CS. With the intake source 320 and the hermetically sealed space CS connected through the intake line 40, the hermetically sealed space CS can be depressurized to have the pressure reduced below the atmospheric pressure (to vacuum pressure for example), with the air inside the hermetically sealed space CS discharged from the hermetically sealed space CS.

The resin injection line 50 is a tube through which the resin material RM is injected into the fiber base material FB1 sealed in the hermetically sealed space CS depressurized using the intake line 40. The resin injection line 50 has one end connected to a supply source 330 for supplying the resin material RM, and has the other end connected to the hermetically sealed space CS. With the supply source 330 and the hermetically sealed space CS connected through the resin injection line 50, the resin material RM can be supplied to the hermetically sealed space CS depressurized using the intake line 40, from the supply source 330.

The removable resin pass medium 60 is a sheet-like medium, with which the resin material RM, supplied from the resin injection line 50, is supplied to the hermetically sealed space CS being diffused entirely over the fiber base material FB1. The removable resin pass medium 60 has a mesh shaped internal structure, for example, to allow the resin material RM to pass through the interior thereof. Therefore, the resin material RM supplied to the hermetically sealed space CS, depressurized using the intake line 40, passes through the interior of the removable resin pass medium 60 to be diffused entirely over the surface of the fiber base material FB1, and is impregnated in the fiber base material FB1.

The removable resin pass medium 60 is, for example, formed by nylon or polyester, and is a sheet that is releasable from the fiber base material FB1. The resin material RM injected into the lateral groove 21b of the main body portion 21 of the molding die 20 is attached, together with the removable resin pass medium 60, to the surface of the composite material 200 after the molding process for the fiber base material FB1 has been completed.

The removable resin pass medium 60 is attached to the surface of the fiber base material FB1. Still, other modes may be employed. For example, spray glue such as tackifier, double-sided tape, or the like may be used to attach the medium to the surface of the molding die 20. In this case, the resin material RM injected into the lateral groove 21b of the main body portion 21 of the molding die 20 is attached, together with the removable resin pass medium 60, to the surface of the molding die 20, after the composite material 200 has been removed from the molding die 20.

Because the removable resin pass medium 60 is releasable, the removal resin pass medium 60 can be easily removed from the fiber base material FB1. By removing the removable resin pass medium 60, the resin material RM injected into the lateral grooves 21b can be easily removed together with the removable resin pass medium 60 from the composite material 200, even if the resin material RM has been cured and attached to the composite material 200.

The intake medium 70 is a sheet-shaped medium with which an excess resin material RM that has passed through the fiber base material FB1 is guided to the intake line 40 being diffused. The intake medium 70 has a mesh shaped internal structure, for example, to allow the resin material RM to pass through the interior thereof. Thus, the excess resin material RM that has passed through the fiber base material FB1 is guided from the surface of the fiber base material FB1 to the intake medium 70 and passes through the interior of the intake medium 70 to be guided to the intake line 40. The intake medium 70 may be, for example, a mesh shaped medium formed by resin or metal. For the intake medium 70, a permeable sheet not permeable to liquid and is only permeable to gas or the like may be used.

Figure 9:
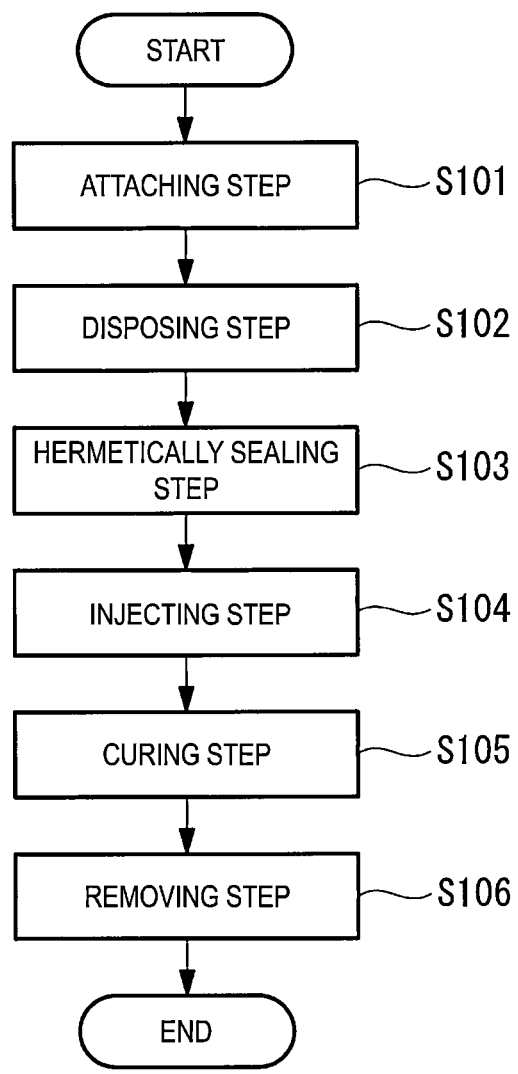
FIG. 9 is a flowchart of a composite material molding method according to the first embodiment of the present disclosure.

Hereinafter, a composite material molding method according to the present embodiment will be described with reference to a drawing. FIG. 9 is a flowchart of the composite material molding method according to the present embodiment.

In step S101 (attaching step), the removable resin pass medium 60 is attached to a surface of the fiber base material FB1 facing the mold surface 20a and the mold surface 20b. The removable resin pass medium 60 is attached to the fiber base material FB1 by, for example, melting thermoplastic resin in a powder form. As described above, the removable resin pass medium 60 may be attached to the surface of the molding die 20 instead of being attached to the surface of the fiber base material FB1.

In step S102 (disposing step), the fiber base material FB1 with the core portion 10 accommodated in the recessed portion CP is disposed in the molding die 20. Specifically, the fiber base material FB1 having the releasable removable resin pass medium 60 attached to the surface in advance is disposed on the molding surfaces 20a and the molding surface 20b of the molding die 20. The core portion 10 is disposed on the fiber base material FB1 and the intake medium 70 is disposed on the fiber base material FB1.

In step S103 (hermetically sealing step), the hermetically sealed space CS is formed with the fiber base material FB1 sealed in the molding die 20. Specifically, the hermetically sealed space CS is formed with the bagging film joined to the molding die 20 to cover the entire circumference of the molding die 20 using the sealant tape ST. When the hermetically sealing step in step S102 is completed, the state illustrated in FIG. 1 is achieved.

In step S103 (hermetically sealing step), when the hermetically sealed space CS is formed, the resin injection line 50 connected to the supply source 330 of the resin material RM and the hermetically sealed space CS are in communication with each other. Furthermore, when the hermetically sealed space CS is formed, the intake line 40 connected to the intake source 320 and the hermetically sealed space CS are in communication with each other.

In step S104 (injecting step), by intaking the air in the hermetically sealed space CS formed in step S102 (hermetically sealing step), the hermetically sealed space CS is depressurized and the resin material RM is injected into the fiber base material FB1 sealed in the hermetically sealed space CS. Specifically, the intake source 320 is actuated to discharge the air in the hermetically sealed space CS from the hermetically sealed space CS through the intake line 40, whereby the hermetically sealed space CS is depressurized to have the pressure therein dropped below the atmospheric pressure so that a vacuum state or a near vacuum state is achieved.

Then, a state where the supply source 330 is capable of supplying the resin material RM to the resin injection line 50 is achieved, and the resin material RM is injected to the main groove 21a of the hermetically sealed space CS by means of a pressure difference between the resin injection line 50 and the hermetically sealed space CS depressurized. The resin material RM is supplied through the main groove 21a and moves in the longitudinal direction LD. The resin material RM is guided to the lateral grooves 21b through the communication grooves 21d at a plurality of positions of the main groove 21a in the longitudinal direction LD.

The resin material RM guided entirely over the molding surfaces 20a and the molding surface 20b of the molding die 20 through the lateral grooves 21b passes through the interior of the removable resin pass medium 60 to be diffused entirely over the surface of the fiber base material FB1 and is injected into the fiber base material FB1. As a result, the fiber base material FB1 is impregnated with the resin material RM. A part of the resin material RM impregnated in the fiber base material FB1 passes through the interior of the intake medium 70 to be guided to the intake line 40, and is discharged to the intake line 40 as the excess resin material RM.

When a permeable sheet that is not permeable to liquid and is only permeable to gas or the like is used for the intake medium 70, the excess resin material RM remains in the hermetically sealed space CS without being discharged to the intake line 40. Thus, the resin material RM can be prevented from being discharged without being impregnated in the fiber base material FB1.

In step S104 (injecting step), because the hermetically sealed space CS has been depressurized to have pressure dropped to the vacuum state or the near vacuum state, the fiber base material FB1 and the resin material RM impregnated therein are pressurized by the atmospheric pressure.

In step S105 (curing step), the thermosetting resin material RM injected into the fiber base material FB1 and a fiber base material FB2 in step S104 (injecting step) is heated to a thermosetting temperature or higher by a heating unit (not illustrated), whereby the resin material RM is cured.

Note that when the thermoplastic resin material RM is used, the heating by the heating unit is not performed in step S105 (curing step). In step S105, the resin material RM is cooled to be at a temperature sufficiently lower than a softening temperature.

In step S106 (removing step), the composite material 200 including the cured resin material RM cured in step S104 (curing step) and the fiber base material FB1 is removed from the molding die 20. Specifically, the sealant tape ST joining the bagging film 30 to the molding die 20 is removed, and the bagging film 30 is removed from the molding die 20.

The intake medium 70 is removed from the molding die 20 from which the bagging film 30 has been removed. Thereafter, the composite material 200 with the core portion 10 inserted in the recessed portion CP is removed from the molding die 20. Then, the core portion 10 is removed from the recessed portion CP of the composite material 200. With the step described above, the manufacturing process for the composite material 200 molded by the molding die 20 is completed.

The actions and effects exhibited by the molding apparatus 100 of the above-described present embodiment will now be described.

According to the molding apparatus 100 of the present embodiment, the fiber base material FB1 is disposed on the molding surfaces 20a and the molding surface 20b of the molding die 20, the hermetically sealed space CS is formed with the fiber base material FB1 sealed in the molding die 20 using the bagging film 30, and by intaking the air in the hermetically sealed space CS to depressurize the hermetically sealed space CS, the resin material RM is injected to the main groove 21a of the molding die 20.

The main groove 21a is covered by the lid portion 22, and the lid portion 22 forms a part of the mold surface 20b. Therefore, the fiber base material FB1 disposed on the mold surface 20b does not deform along the shape of the main groove 21a. Instead, the shape is maintained by the mold surface 20b formed by the lid portion 22.

According to the molding apparatus 100 of the present embodiment, the molding die 20 includes the lateral grooves 21b extending in the width direction WD crossing the longitudinal direction LD in which the main groove 21a extends, and the step portions 21c disposed between the main groove 21a and the lateral grooves 21b. The lid portion 22 disposed to cover the main groove 21a is disposed being in contact with the step portions 21c. Thus, the amount of resin material RM flowing into the lateral groove 21b from the main groove 21a is extremely small in a region where the lid portion 22 and the step portions 21c are in contact with each other.

On the other hand, the main body portion 21 includes the communication groove 21d through which the main groove 21a is communicated with the lateral groove 21b. Thus, the resin material RM flowing in the main groove 21a flows into the lateral grooves 21b through the communication groove 21d at a plurality of positions in the longitudinal direction LD in which the main groove 21a extends. The resin material RM that has flowed into the lateral grooves 21b is guided in the width direction WD crossing the longitudinal direction LD, to be diffused in the surface direction of the fiber base material FB1.

The resin material RM diffused in the surface direction is guided in the thickness direction of the fiber base material FB1 and is impregnated in the entirety of the fiber base material FB1. In this manner, according to the molding apparatus 100 of the present embodiment, the resin material RM can be diffused in the surface direction of the fiber base material FB1 without deforming the fiber base material FB1 and can be impregnated in the entirety of the fiber base material FB1.

In the molding apparatus 100 of the present embodiment, the flow path cross-sectional area of the first flow path formed by the main groove 21a is larger than the flow path cross-sectional area of the second flow path formed by one lateral groove 21b. Thus, the pressure loss at the time when the resin material RM flows in the main groove 21a is larger than the pressure loss at the time when the resin material RM flows in the lateral groove 21b. As a result, the amount of resin material guided to the plurality of lateral grooves 21b disposed at a plurality of positions in the longitudinal direction LD can be substantially equalized, whereby resin material RM can be diffused in both the longitudinal direction LD and the width direction WD within the surface of the fiber base material FB1.

Second Embodiment

Figure 10:
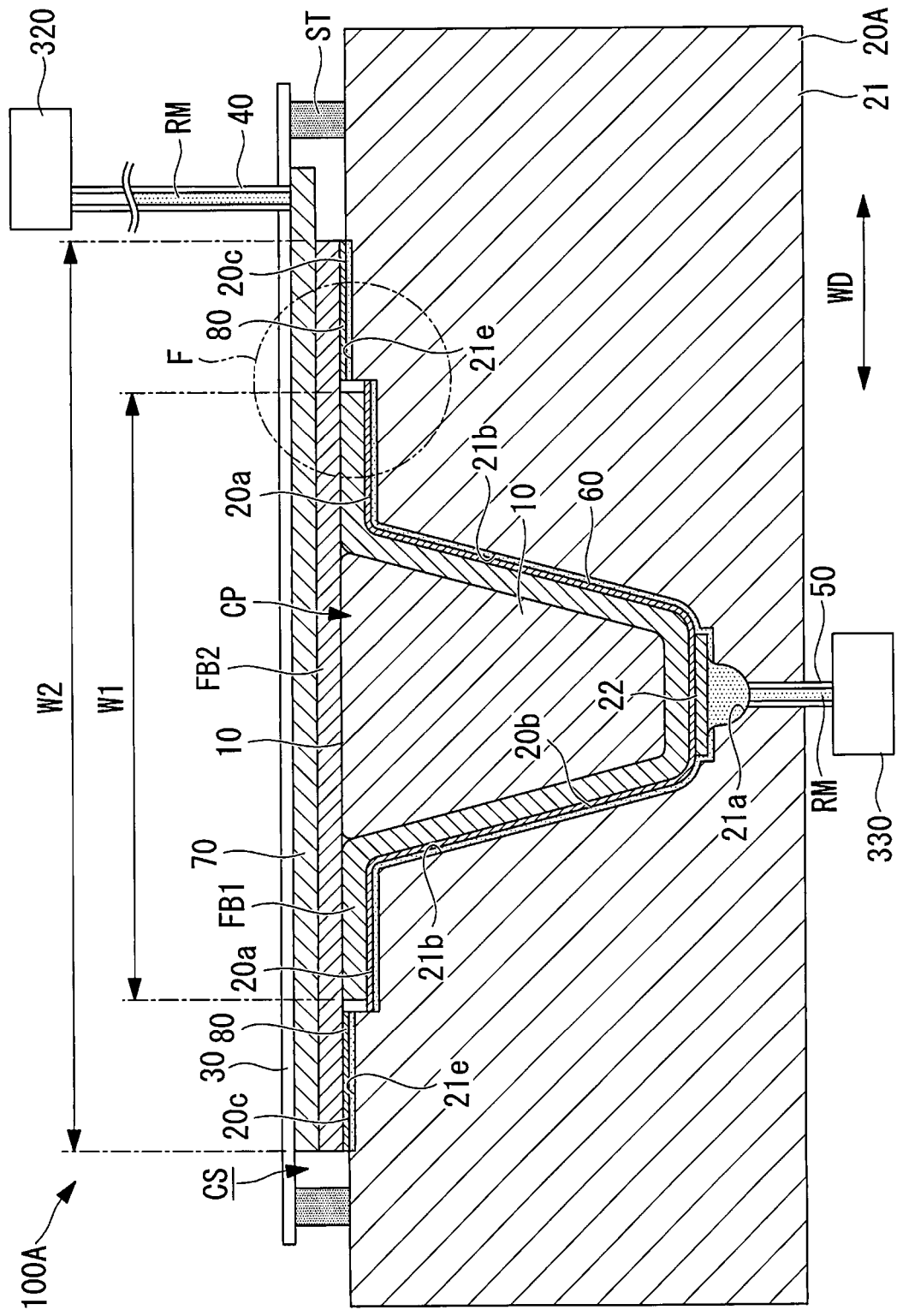
FIG. 10 is a horizontal cross-sectional view illustrating a molding apparatus according to a second embodiment of the present disclosure, and is a horizontal cross-sectional view taken at a position where a lateral groove is formed in a molding die.
Figure 11:
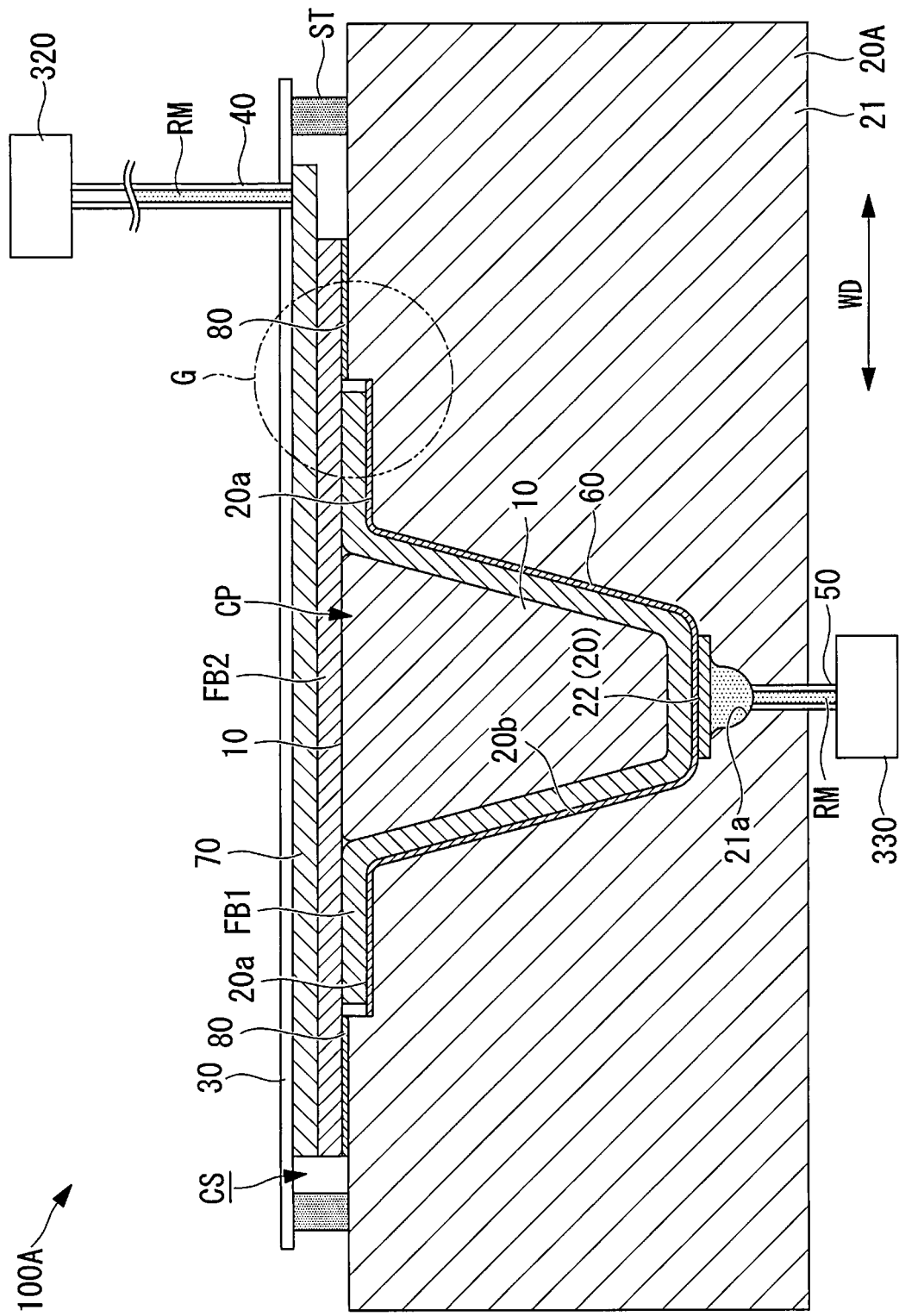
FIG. 11 is a horizontal cross-sectional view illustrating the molding apparatus according to the second embodiment of the present disclosure, and is a horizontal cross-sectional view taken at a position where the lateral groove is not formed in the molding die.
Figure 12:
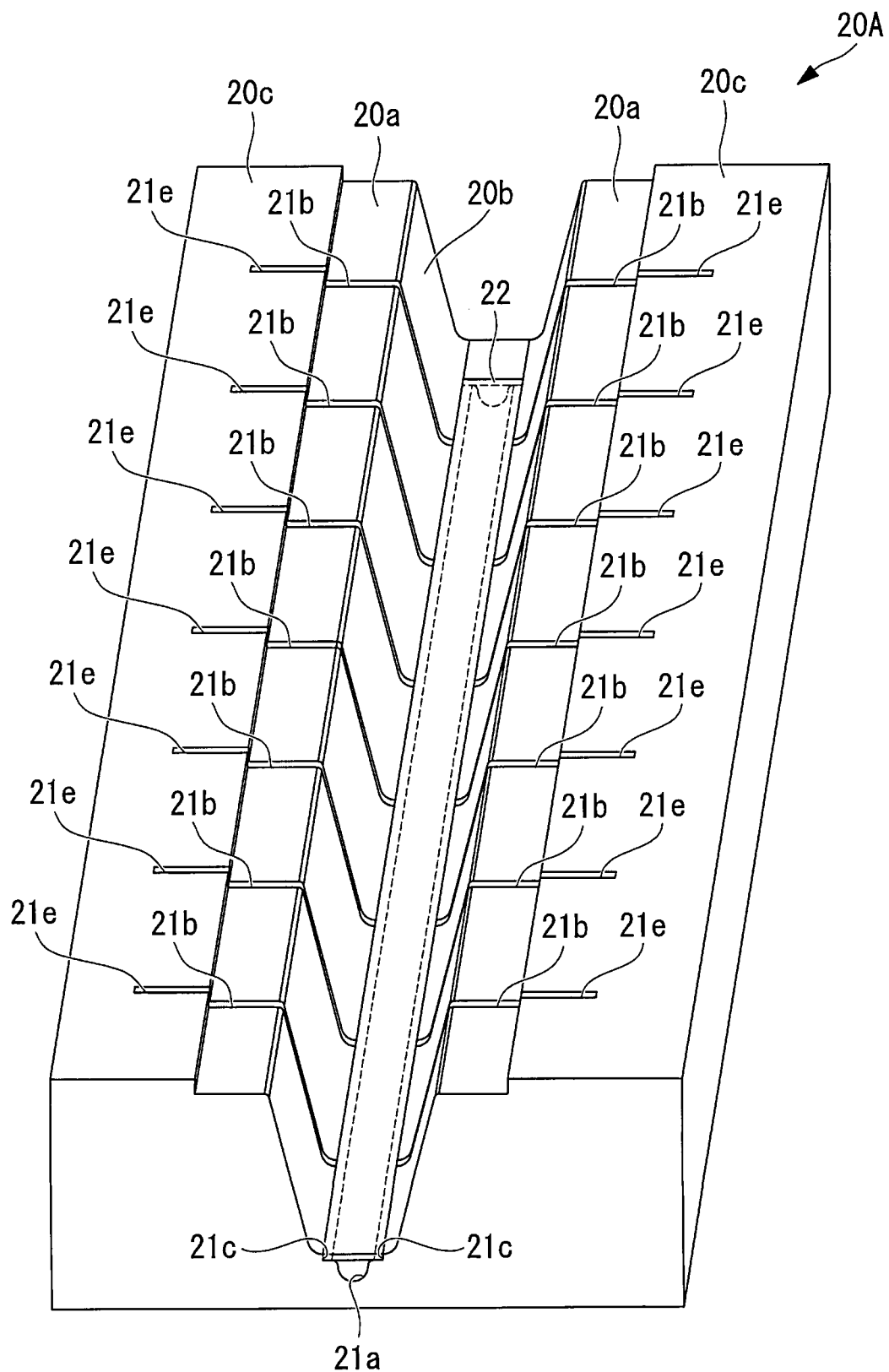
FIG. 12 is a perspective view of the molding die illustrated in FIG. 10.

Next, a molding apparatus 100A according to a second embodiment of the present disclosure will be described with reference to the drawings. FIG. 10 is a horizontal cross-sectional view illustrating the molding apparatus 100A according to the present embodiment and is a horizontal cross-sectional view taken at a position where the lateral groove 21b and a lateral groove 21e are formed in a molding die 20A. FIG. 11 is a horizontal cross-sectional view illustrating the molding apparatus 100A according to the present embodiment and is a horizontal cross-sectional view taken at a position where the lateral groove 21b and the lateral groove 21e are not formed in the molding die 20A. FIG. 12 is a perspective view of the molding die 20A illustrated in FIG. 10.

Figure 13:
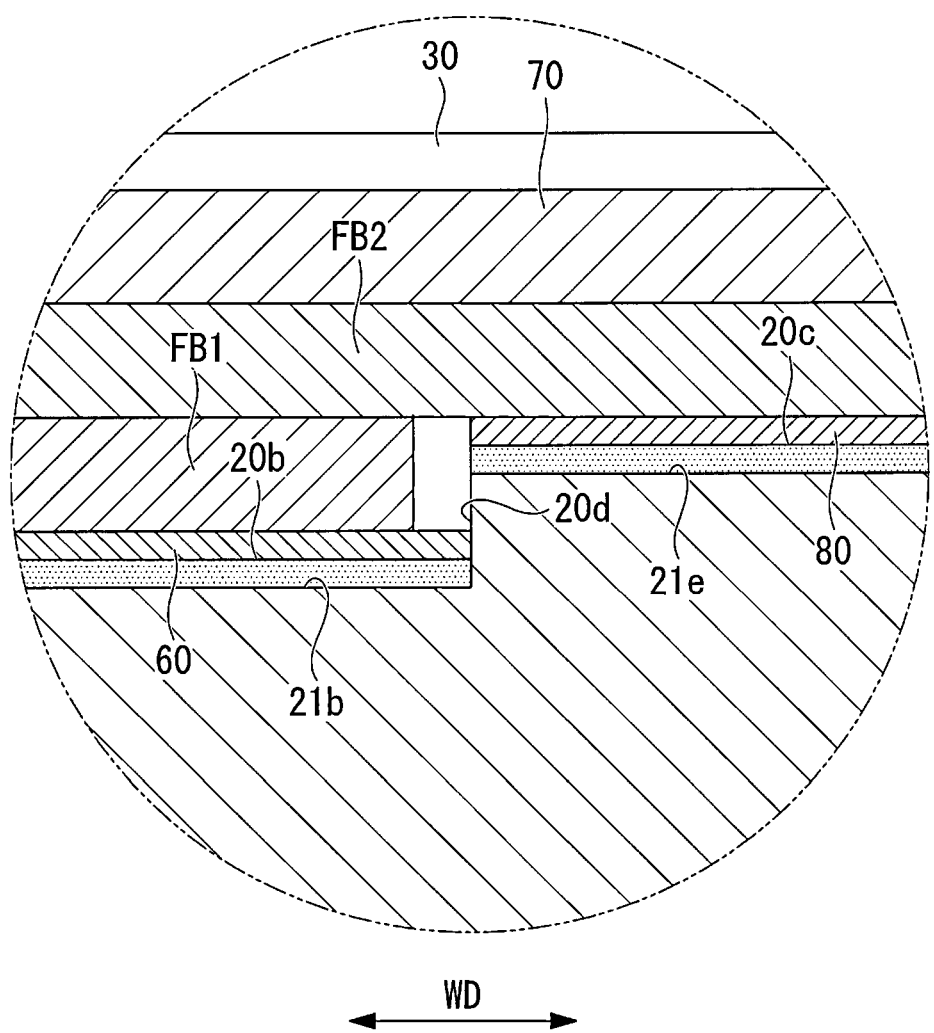
FIG. 13 is a partially enlarged view of a F part illustrated in FIG. 10.
Figure 14:
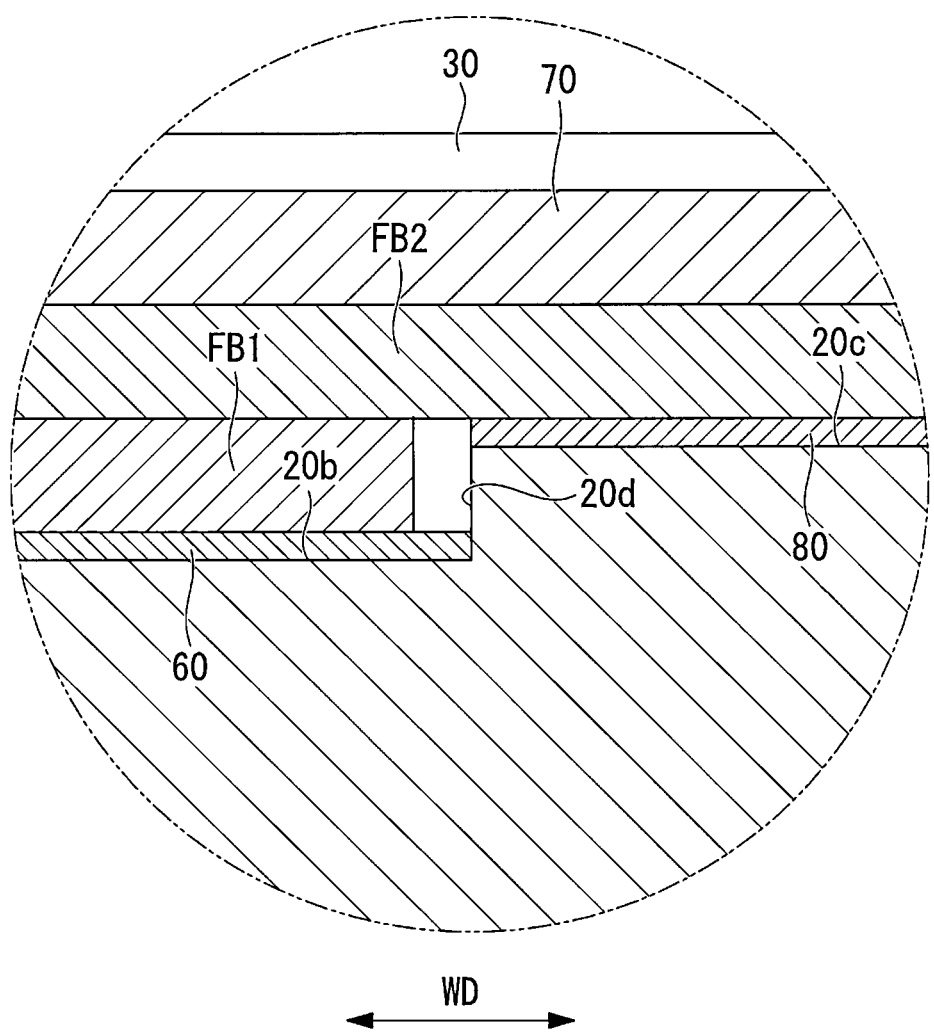
FIG. 14 is a partially enlarged view of a G part illustrated in FIG. 11.

FIG. 13 is a partially enlarged view of a F part illustrated in FIG. 10. FIG. 14 is a partially enlarged view of a G part illustrated in FIG. 11. The present embodiment is a modification example of the first embodiment. Unless otherwise described below, the present embodiment is similar to the first embodiment, and description is omitted below.

With the molding die 20 of the molding apparatus 100 of first embodiment, the composite material 200 is molded by impregnating the resin material RM in a single fiber base material FB1. On the other hand, with the molding die 20A of the molding apparatus 100A according to the present embodiment, the composite material 200 is molded by combining the fiber base material FB1 and a fiber base material FB2.

As illustrated in FIG. 10, the molded mold 20A of the present embodiment includes the molding surface 20a, the molding surface 20b, a molding surface 20c, and a wall portion 20d. The mold surface 20a and the mold surface 20b are each a mold surface on which the fiber base material FB1 having a first width W1 in the width direction WD orthogonal to the longitudinal direction LD is disposed.

The mold surface 20c is a mold surface on which the fiber base material FB2 having a flat shape and a second width W2 that is greater than the first width W1 in the width direction WD, is disposed. As illustrated in FIGS. 10 and 12, a lateral groove (third groove portion) 21e extending along the width direction WD is formed in the mold surface 20c. The lateral groove 21e is formed at the same position as the lateral groove 21b in the longitudinal direction LD.

The wall portion 20d is a portion provided with a ridge, with which the mold surface 20a and the mold surface 20c are connected, extending along the longitudinal direction LD. The wall portion 20d is formed in a flat shape over the entire region in the longitudinal direction LD. Thus, the wall portion 20d is provided with no groove through which the resin material RM flows into the lateral groove 21e from the lateral groove 21b.

As illustrated in FIGS. 10 and 11, the molding apparatus 100A according to the present embodiment includes a removable resin pass medium (sheet) 80. The removable resin pass medium 80 is a sheet-like medium, with which the resin material RM, supplied from the resin injection line 50, is supplied to the hermetically sealed space CS being diffused entirely over the fiber base material FB2. The removable resin pass medium 80 has a mesh shaped internal structure, for example, to allow the resin material RM to pass through the interior thereof. Therefore, the resin material RM supplied to the hermetically sealed space CS, depressurized using the intake line 40, passes through the interior of the removable resin pass medium 60 to be diffused entirely over the surface of the fiber base material FB2, and is impregnated in the fiber base material FB2.

The removable resin pass medium 80 is, for example, formed of nylon or polyester and is a sheet that is releasable from the fiber base material FB2. The resin material RM injected into the lateral groove 21e of the main body portion 21 of the molding die 20A adheres, together with the removable resin pass medium 80, on the surface of the composite material 200 after the molding process for the fiber base material FB2 has been completed.

Because the removable resin pass medium 80 is releasable, the removable resin pass medium 80 can be easily removed from the fiber base material FB2. By removing the removable resin pass medium 80, the resin material RM injected into the lateral grooves 21e can be easily removed together with the removable resin pass medium 80 from the composite material 200 even if the resin material RM has been cured and adhered on the composite material 200.

As illustrated in FIGS. 13 and 14, in the present embodiment, in step S101 (attaching step) of the composite material molding method, the removable resin pass medium 60 is attached to a region other than a region of the fiber base material FB1 facing the wall portion 20d, and the removable resin pass medium 80 is attached to the fiber base material FB2 not to intrude the wall portion 20d.

In the present embodiment, as illustrated in FIG. 10, in step S102 (disposing step) of the composite material molding method, the fiber base material FB1 is disposed on the mold surface 20b with the removable resin pass medium 60 sandwiched in between, and the fiber base material FB2 is disposed on the mold surface 20c with the removable resin pass medium 80 sandwiched in between.

The removable resin pass medium 60 is disposed on a region other than a region of the fiber base material FB1 facing the wall portion 20d, and the removable resin pass medium 80 is disposed on a region other than a region of the fiber base material FB2 facing the wall portion 20d.

In step S101 (attaching step), the removable resin pass medium 60 is attached to the fiber base material FB1, so that the resin material RM injected into the lateral grooves 21b and attached to a product (composite material 200) obtained by the molding can be easily removed from the product. Similarly, the releasable removable resin pass medium 80 is attached to the fiber base material FB2.

The removable resin pass media 60 and 80 provide the advantage that the resin material RM attached to the product can be easily removed from the product, but the quality of the molded product is compromised if the removable resin pass media 60 and 80 enter between the fiber base material fiber base material FB1 and the fiber base material FB2. In view of this, in the present embodiment, the removable resin pass media 60 and 80 are prevented from entering between the fiber base material FB1 and the fiber base material FB2.

Because the removable resin pass media 60 and 80 are not disposed on the wall portion 20d, if a groove is formed in the wall portion 20d, the resin material RM in the groove cures and attaches to the product and cannot be easily removed. Thus, in the present embodiment, the wall portion 20d is formed to be flat over the entire region in the longitudinal direction LD, to prevent product failure.

Figure 15:
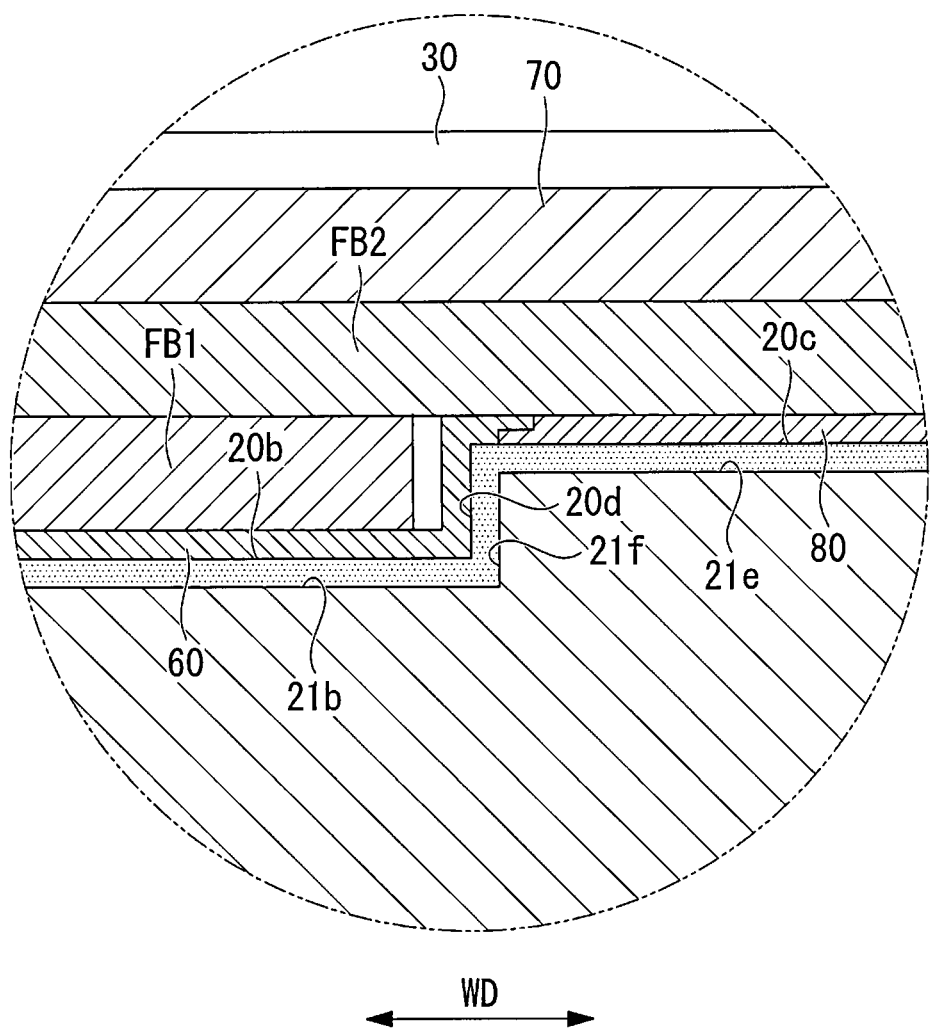
FIG. 15 is a partially enlarged view illustrating a first modification example of the F part illustrated in FIG. 10.
Figure 16:
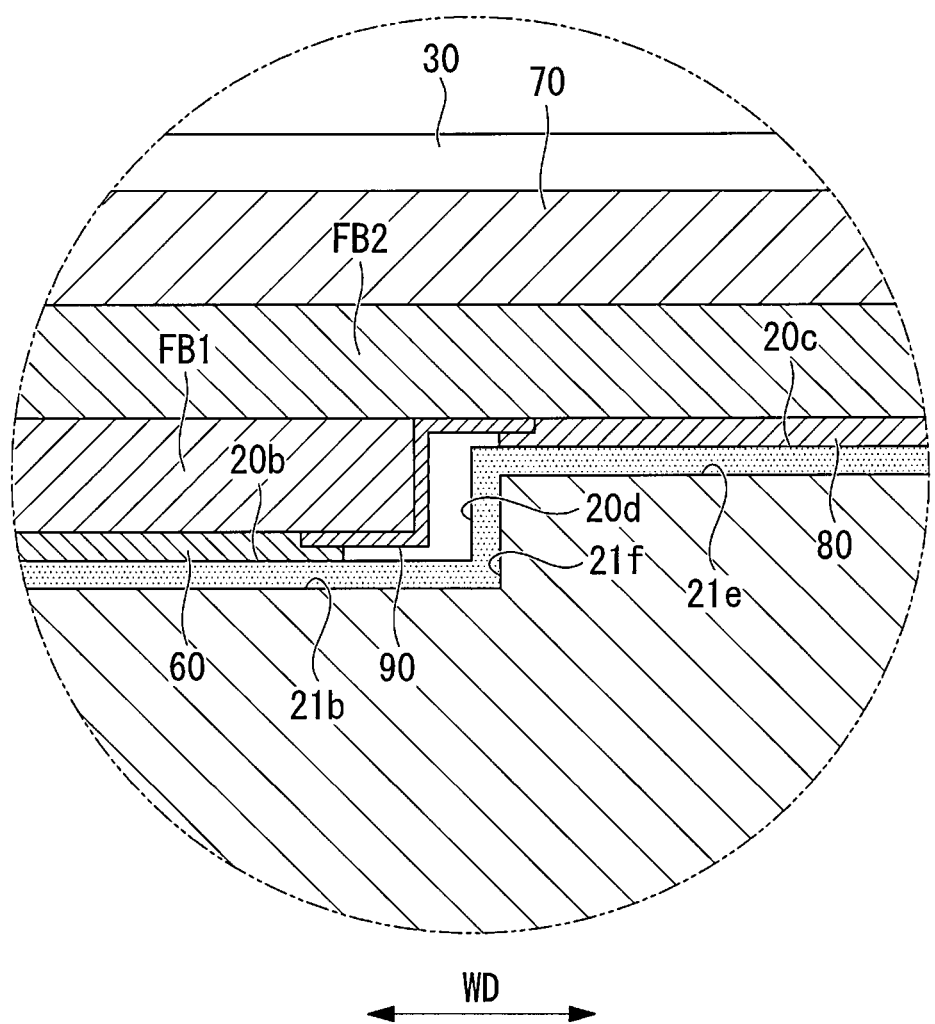
FIG. 16 is a partially enlarged view illustrating a second modification example of the F part illustrated in FIG. 10.
Figure 17:
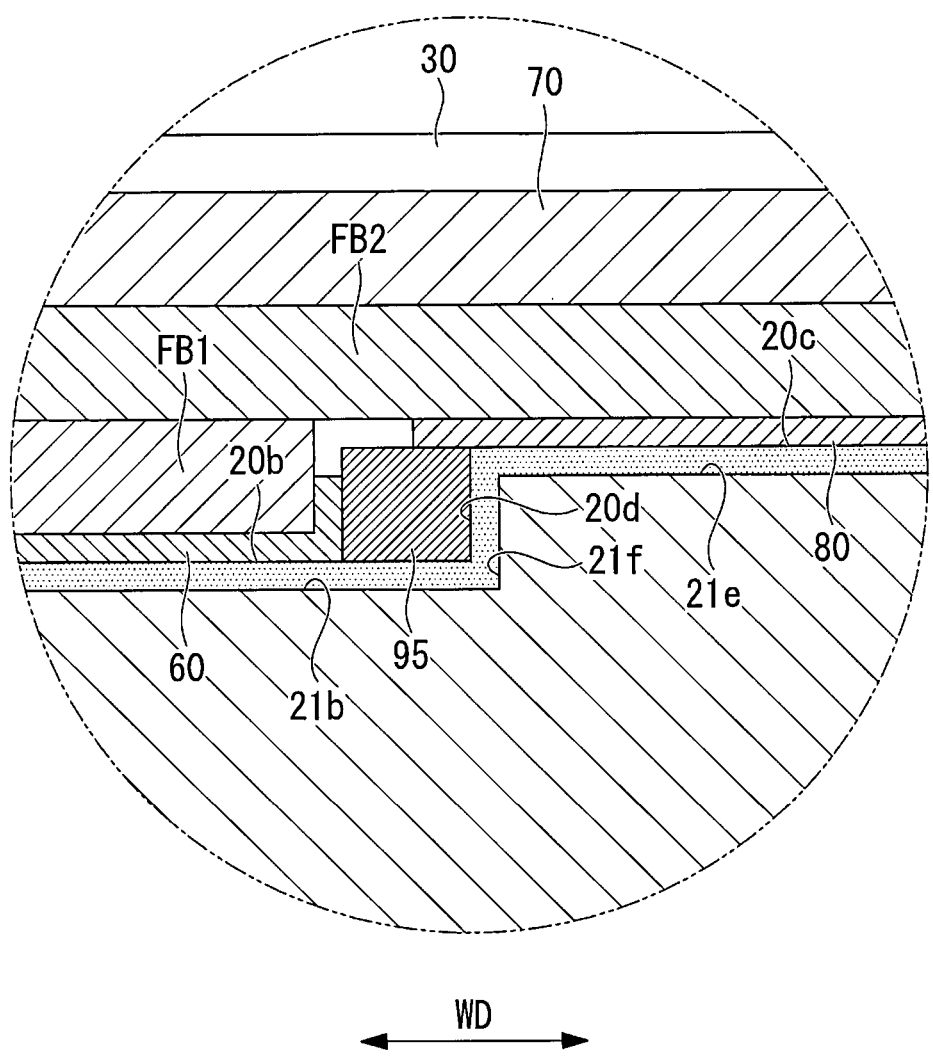
FIG. 17 is a partially enlarged view illustrating a third modification example of the F part illustrated in FIG. 10.
Figure 18:
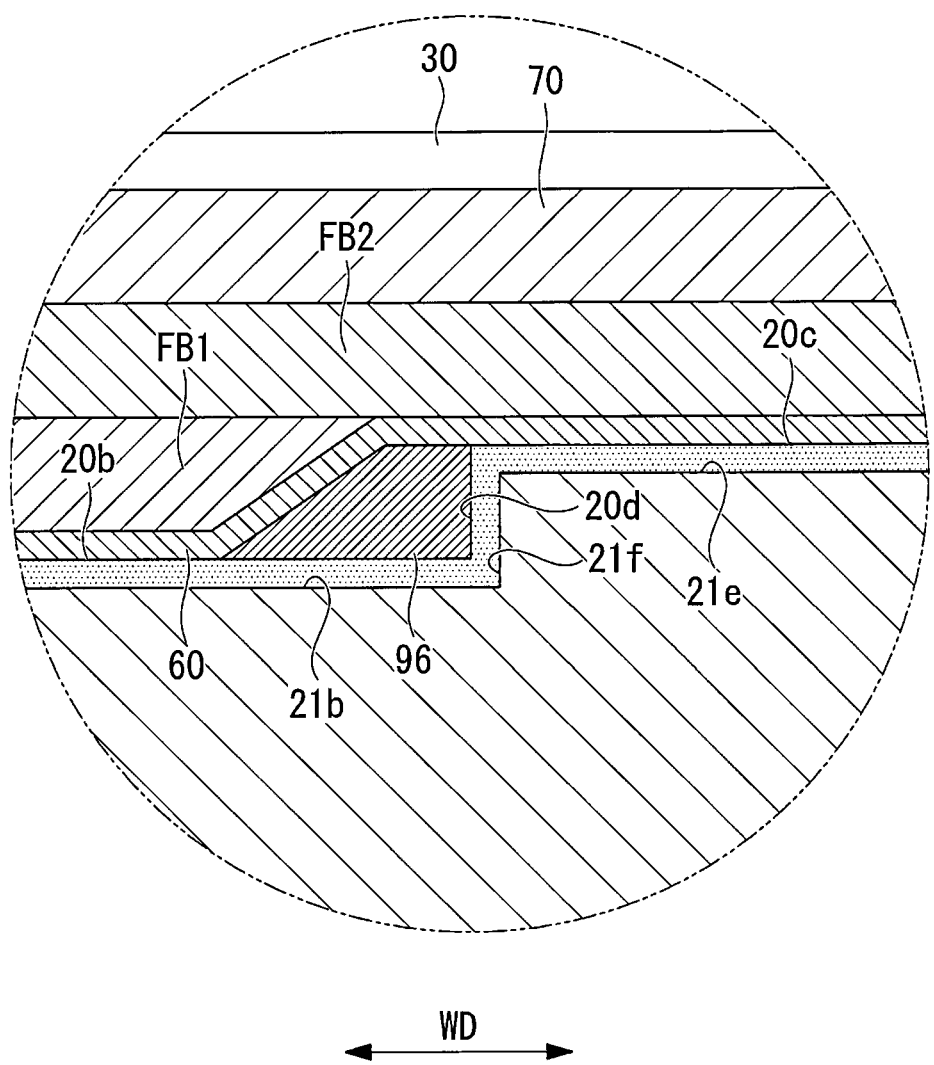
FIG. 18 is a partially enlarged view illustrating a fourth modification example of the F part illustrated in FIG. 10.

In the present embodiment described above, the wall portion 20d is formed to be flat over the entire region in the longitudinal direction LD. Still, other modes may be employed. For example, a modification example may be employed in which the wall portion 20d is provided with a connection groove 21f through which the lateral groove 21b is connected to the lateral groove 21e. FIG. 15 is a diagram illustrating a first modification example of the F part illustrated in FIG. 10. FIG. 16 is a diagram illustrating a second modification example of the F part illustrated in FIG. 10. FIG. 17 is a diagram illustrating a third modification example of the F part illustrated in FIG. 10. FIG. 18 is a diagram illustrating a fourth modification example of the F part illustrated in FIG. 10.

FIG. 15 is a partially enlarged view illustrating the first modification example of the F part illustrated in FIG. 10. As illustrated in FIG. 15, the wall portion 20d includes the connection groove 21f through which the lateral groove 21b is connected to the lateral groove 21e. On the wall portion 20d, the removable resin pass medium 60 is attached to the fiber base material FB1 and the fiber base material FB2 to cover the region facing the wall portion 20d.

As illustrated in FIG. 15, in the first modification example, in step S101 (attaching step) of the composite material molding method, the removable resin pass medium 60 is attached to the fiber base material FB1 and the fiber base material FB2 so as to cover the region facing the wall portion 20d. The removable resin pass medium 80 is attached to the fiber base material FB2.

In the first modification example, as illustrated in FIG. 15, in step S102 (disposing step) of the composite material molding method, the fiber base material FB1 is disposed on the mold surface 20b with the removable resin pass medium 60 sandwiched in between, and the fiber base material FB2 is disposed on the mold surface 20c with the removable resin pass medium 80 sandwiched in between.

The removable resin pass medium 60 is disposed on the fiber base material FB1 to cover the region facing the wall portion 20d, for easily removing the resin material RM existing in the connection groove 21f formed in the wall portion 20d when such a resin material RM is cured and attached to the product.

FIG. 16 is a partially enlarged view illustrating the second modification example of the F part illustrated in FIG. 10. As illustrated in FIG. 16, the wall portion 20d includes the connection groove 21f through which the lateral groove 21b is connected to the lateral groove 21e. The removable resin pass medium 60 is attached to a region other than a region of the fiber base material FB1 facing the wall portion 20d. The removable resin pass medium 80 is attached to a region other than a region of the fiber base material FB1 facing the wall portion 20d.

As illustrated in FIG. 16, in the second modification example, in step S101 (attaching step) of the composite material molding method, the removable resin pass medium 60 is attached to a region other than a region of the fiber base material FB1 facing the wall portion 20d. The removable resin pass medium 80 is attached to the fiber base material FB2. An adhesive tape 90 is adhered to the fiber base material FB1 and the fiber base material FB2, with its adhesive surface covering the region facing the wall portion 20d.

In the second modification example, as illustrated in FIG. 16, in step S102 (disposing step) of the composite material molding method, the fiber base material FB1 is disposed on the mold surface 20b with the removable resin pass medium 60 sandwiched in between, and the fiber base material FB2 is disposed on the mold surface 20c with the removable resin pass medium 80 sandwiched in between.

The adhesive tape 90 is adhered to the fiber base material FB1 and the fiber base material FB2 with the adhesive surface covering the region facing the wall portion 20d, to prevent product failure due to entrance of the removable resin pass medium 60 and the removable resin pass medium 80 in a gap between the fiber base material FB1 and the fiber base material FB2 when the molding is performed with the fiber base material FB1 and the fiber base material FB2 being in contact with each other.

FIG. 17 is a partially enlarged view illustrating the third modification example of the F part illustrated in FIG. 10. As illustrated in FIG. 17, the wall portion 20d includes the connection groove 21f through which the lateral groove 21b is connected to the lateral groove 21e. Also, a block 95 is disposed to extend along the longitudinal direction LD being in contact with the wall portion 20d. An end portion of the removable resin pass medium 60 is disposed between the fiber base material FB1 and the block 95, and an end portion of the removable resin pass medium 80 is disposed between the fiber base material FB2 and the block 95.

In the third modification example illustrated in FIG. 17, the block 95 extending along the longitudinal direction LD being in contact with the wall portion 20d is disposed to prevent the resin material RM existing in the connection groove 21f from curing and attaching to a region of the end portion of the fiber base material FB1 in the width direction WD. For the block 95, a metal material such as aluminum and iron, a block shaped resin material such as silicone resin or fluororesin, a sponge made of resin, and the like may be used.

FIG. 18 is a partially enlarged view illustrating the fourth modification example of the F part illustrated in FIG. 10. As illustrated in FIG. 18, the wall portion 20d includes the connection groove 21f through which the lateral groove 21b is connected to the lateral groove 21e. Also, a block 96 is disposed to extend along the longitudinal direction LD being in contact with the wall portion 20d. The removable resin pass medium 60 is continuously disposed to a region between the fiber base material FB2 and the mold surface 20c, to cover the end portion of the fiber base material FB1 in the width direction WD.

In the fourth modification example illustrated in FIG. 18, the block 96 extending along the longitudinal direction LD being in contact with the wall portion 20d is disposed to prevent the resin material RM existing in the connection groove 21f from curing and attaching to a region of the end portion of the fiber base material FB1 in the width direction WD. For the block 96, a metal material such as aluminum and iron, a block shaped resin material such as silicone resin or fluororesin, a sponge made of resin, and the like may be used.

The block 95 of the third modification example illustrated in FIG. 17 has a substantially square shape in cross-sectional view, because an end surface of the fiber base material FB1 is substantially orthogonal to the mold surface 20b. On the other hand, the block 96 of the fourth modification example illustrated in FIG. 18 is formed in a shape that is inclined at a certain slope to have a height, relative to the mold surface 20b, gradually increasing toward the end portion of the fiber base material FB1 in the width direction WD.

In the fourth modification example, the end portion of the fiber base material FB1 in the width direction WD has a shape inclined at a certain slope to have a height decreasing toward the fiber base material FB2, to correspond to the block 96. With the block 96 having the inclined shape, a bent portion of the removable resin pass medium 60 disposed along the inclined surface of the block 96 is mildly bent.

Thus, the removable resin pass medium 60 can easily be disposed on the inclined surface of the block 96. Furthermore, when the removable resin pass medium 60 is disposed on the inclined surface of the block 96, defect such as formation of wrinkles on the removable resin pass medium 60 and entrance of the removable resin pass medium 60 between the fiber base material FB1 and the fiber base material FB2 can be suppressed.

Other Embodiments

In the above description, the resin injection line 50 is provided on the lower side of the molding die 20, and the intake line 40 is provided on the upper side of the molding die 20. Still, other modes may be employed. For example, the resin injection line 50 may be provided on the upper side of the molding die 20, and the intake line 40 may be provided on the lower side of the molding die 20.

In the above description, the hermetically sealed space CS is depressurized to inject the resin material RM into the hermetically sealed space CS from the resin injection line 50. Still, other modes may be employed. For example, the resin material RM may be pressurized and pushed into the resin injection line 50 by the supply source 330, to inject the resin material RM into the hermetically sealed space CS from the resin injection line 50.

In the above description, the molding die 20 is a female mold having the molding surfaces 20a and the molding surface 20b having a shape recessed downward from the molding surfaces 20a. Still, other modes may be employed. For example, it may be a male mold having a flat surface and a protruding portion protruding upward from the flat surface.

The fiber-reinforced composite material molding apparatus, which has been described in the embodiment described above, is understood as follows, for example.

A fiber-reinforced composite material molding apparatus according to the present disclosure includes a molding die (20) having a molding surface (20a, 20b) on which a fiber base material (FB1, FB2) is disposed, the molding surface extending along a first direction (LD), a hermetically sealing member (30) that seals the fiber base material in the molding die to form a hermetically sealed space (CS), an intake part (40) that intakes air in the hermetically sealed space to depressurize the hermetically sealed space, and a resin injection part (50) that injects a resin material into the fiber base material sealed in the hermetically sealed space depressurized by the intake part. The molding die includes a main body portion (21) including a first groove portion (21a) that extends along the first direction and is connected to the resin injection part, second groove portions (21b) that are formed at a plurality of positions in the first direction and extend along a second direction (WD) crossing the first direction, and a step portion (21c) that extends along the first direction and is disposed between the first groove portion and the second groove portions, and a lid portion (22) that extends along the first direction, is disposed being in contact with the step portion to cover the first groove portion, and forms a part of the molding surface. Either the main body portion or the lid portion includes a communication groove (21d) through which the first groove portion is communicated with the second groove portions.

With the fiber-reinforced composite material molding apparatus according to the present disclosure, the fiber base material is disposed on the molding surface of the molding die, the hermetically sealed space is formed with the fiber base material sealed in the molding die using the hermetically sealing member, and by intaking the air in the hermetically sealed space to depressurize the hermetically sealed space, the resin material is injected to the first groove portion of the molding die. The first groove portion is covered by the lid portion, and the lid portion forms a part of the mold surface. Therefore, the fiber base material disposed on the mold surface does not deform along the shape of the first groove portion. Instead, the shape is maintained by the mold surface formed by the lid portion.

With the fiber-reinforced composite material molding apparatus according to the present disclosure, the molding die includes the second groove portions extending in the second direction crossing the first direction in which the first groove portion extends, and the step portion disposed between the first groove portion and the second groove portions. The lid portion disposed to cover the first groove portion is disposed being in contact with the step portion. Thus, the amount of resin material RM flowing into the second groove portions from the first groove portion is extremely small in a region where the lid portion and the step portion are in contact with each other.

On the other hand, either the main body portion or the lid portion includes a communication groove through which the first groove portion is communicated with the second groove portions. Thus, the resin material flowing in the first groove portion flows into the second groove portions through the communication groove at a plurality of positions in the first direction in which the first groove portion extends. The resin material that has flowed into the second groove portions is guided in the second direction crossing the first direction to be diffused in the surface direction of the fiber base material. The resin material diffused in the surface direction is guided in the thickness direction of the fiber base material and is impregnated in the entirety of the fiber base material. In this manner, with the fiber-reinforced composite material molding apparatus according to the present disclosure, the resin material can be diffused in the surface direction of the fiber base material without deforming the fiber base material and can be impregnated in the entirety of the fiber base material.

Preferably, in the fiber-reinforced composite material molding apparatus according to the present disclosure, a flow path cross-sectional area of a first flow path formed by the first groove portion (21a) is larger than a flow path cross-sectional area of second flow paths formed by the second groove portions (21b).

The flow path cross-sectional area of the first flow path formed by the first groove portion is larger than the flow path cross-sectional area of the second flow path formed by one second groove portion. Thus, the pressure loss at the time when the resin material flows in the first groove portion is larger than the pressure loss at the time when the resin material flows in the second groove portion. As a result, the amount of resin material guided to the plurality of second groove portions disposed at a plurality of positions in the longitudinal direction can be substantially equalized, whereby the resin material can be diffused in both the first direction and the second direction within the surface of the fiber base material.

Preferably, in the fiber-reinforced composite material molding apparatus according to the present disclosure, the first groove portion is formed in such a manner that the flow path cross-sectional area of the first flow path gradually decreases from one end in the first direction close to the resin injection part toward another end in the first direction.

With the cross-sectional area of the first flow path formed by the first groove portion gradually decreasing from the upstream side toward the downstream side in the flow direction of the resin material, the amount of resin material remaining in the first groove portion without being impregnated in the fiber base material can be made small.

Preferably, in the fiber-reinforced composite material molding apparatus according to the present disclosure, the molding die includes a first molding surface on which a first fiber base material having a first width (W1) in a width direction (WD) orthogonal to the first direction is disposed, a second molding surface on which a second fiber base material having a second width (W2) greater than the first width along the width direction is disposed, and a wall portion (20d) that extends along the first direction and through which the first molding surface is connected to the second molding surface, a third groove portion (21d) extending along the second direction is formed in the second molding surface, and the wall portion is formed to be flat over an entire region in the first direction.

A releasable sheet may be attached to the fiber base material, so that the resin material injected into the second groove portions and attached to the product obtained by the molding can be easily removed from the product. The releasable sheet provides the advantage that the resin material attached to the product can be easily removed from the product, but the quality of the molded product is compromised if the sheet enters between the first fiber base material and the second fiber base material. Thus, to prevent the entrance of the releasable sheet between the first fiber base material and the second fiber base material, the releasable sheet is preferably attached to a region other than a region of the first fiber base material facing the wall portion.

In this case, when a groove portion through which the resin material enters into the wall portion is provided, the resin material injected into the groove portion attaches to the product obtained by the molding, to compromise the quality of the product obtained by the molding. Therefore, with the fiber-reinforced composite material molding apparatus of this configuration, the wall portion is formed to be flat over the entire region in the first direction. With the fiber-reinforced composite material molding apparatus of this configuration, with the wall portion having the flat shape, the resin material with a shape of the groove portion does not attach to the fiber base material facing the wall portion, whereby the quality of the product obtained by the molding can be prevented from being compromised.

Preferably, in the fiber-reinforced composite material molding apparatus according to the present disclosure, the molding die includes a first molding surface on which a first fiber base material having a first width (W1) in a width direction (WD) orthogonal to the first direction is disposed, a second molding surface on which a second fiber base material having a second width (W2) greater than the first width along the width direction is disposed, and a wall portion (20d) that extends along the first direction and is configured to connect the first molding surface with the second molding surface, a third groove portion (21d) extending along the second direction is formed in the second molding surface, and the wall portion includes a connection groove (21f) through which the second groove portions are connected to the third groove portion.

A releasable sheet may be attached to the fiber base material, so that the resin material injected into the second groove portions and attached to the product obtained by the molding can be easily removed from the product. The releasable sheet provides the advantage that the resin material attached to the product can be easily removed from the product, but the quality of the molded product is compromised if the sheet enters between the first fiber base material and the second fiber base material. Thus, to prevent the entrance of the releasable sheet between the first fiber base material and the second fiber base material, the releasable sheet is preferably attached to the first fiber base material to cover the region facing the wall portion.

With the fiber-reinforced composite material molding apparatus of this configuration, the wall portion has the connection groove, so that the resin material that has flowed into the second groove portions from the first groove portion can flow into the third groove portion to be sufficiently diffused in the surface of the second fiber base material. With the releasable sheet covering the region facing the wall portion, even when the resin material injected into the connection groove is attached to the product obtained by the molding, the resin material can be easily removed by removing the sheet.

Preferably, in the fiber-reinforced composite material molding apparatus according to the present disclosure, the first groove portion (21*a*) has a shape with a groove width (WG) gradually decreasing toward a bottom portion.

With the fiber-reinforced composite material molding apparatus of this configuration, the first groove portion has a shape with the groove width gradually decreasing toward the bottom portion, so that the resin material cured in the first groove portion can be easily removed from the molding die.

The fiber-reinforced composite material molding method, which has been described in the embodiment described above, is understood as follows, for example.

A fiber-reinforced composite material molding method according to the present disclosure is for molding a composite material (200) by using a molding die (20). The molding die (20) includes a main body portion (21) including a first groove portion (21*a*) that extends along a first direction (LD), second groove portions (21*b*) that are formed at a plurality of positions in the first direction and extend along a second direction (WD) crossing the first direction, and a step portion (21*c*) that extends along the first direction and is disposed between the first groove portion and the second groove portions, and a lid portion (22) that extends along the first direction, is disposed being in contact with the step portion to cover the first groove portion, and forms a part of a molding surface. Either the main body portion or the lid portion includes a communication groove (21*d*) through which the first groove portion is communicated with the second groove portions. The method includes a disposing step (S102) of disposing a fiber base material (FB1, FB2) on the molding surface extending along the first direction (LD), a hermetically sealing step (S103) of sealing the fiber base material in the molding die by using a hermetically sealing member (30) to form a hermetically sealed space (CS), and an injecting step (S104) of intaking air in the hermetically sealed space formed by the hermetically sealing step to depressurize the hermetically sealed space and injecting a resin material into the first groove portion.

With the fiber-reinforced composite material molding method according to the present disclosure, the fiber base material is disposed on the molding surface of the molding die, the hermetically sealed space is formed with the fiber base material sealed in the molding die using the hermetically sealing member, and by intaking the air in the hermetically sealed space to depressurize the hermetically sealed space, the resin material is injected to the first groove portion of the molding die. The first groove portion is covered by the lid portion, and the lid portion forms a part of the mold surface. Therefore, the fiber base material disposed on the mold surface does not deform along the shape of the first groove portion. Instead, the shape is maintained by the mold surface formed by the lid portion.

With the fiber-reinforced composite material molding method according to the present disclosure, the molding die includes the second groove portions extending in the second direction crossing the first direction in which the first groove portion extends, and the step portion disposed between the first groove portion and the second groove portions. The lid portion disposed to cover the first groove portion is disposed being in contact with the step portion. Thus, the resin material does not flow into the second groove portions from the first groove portion in a region where the lid portion and the step portion are in contact with each other.

On the other hand, either the main body portion or the lid portion includes a communication groove through which the first groove portion is communicated with the second groove portions. Thus, the resin material flowing in the first groove portion flows into the second groove portions through the communication groove at a plurality of positions in the first direction in which the first groove portion extends. The resin material that has flowed into the second groove portions is guided in the second direction crossing the first direction to be diffused in the surface direction of the fiber base material. The resin material diffused in the surface direction is guided in the thickness direction of the fiber base material and is impregnated in the entirety of the fiber base material. In this manner, with the fiber-reinforced composite material molding method according to the present disclosure, the resin material can be diffused in the surface direction of the fiber base material without deforming the fiber base material and can be impregnated in the entirety of the fiber base material.

Preferably, the fiber-reinforced composite material molding method according to the present disclosure includes an attaching step (S101) of attaching a releasable sheet (60) on the fiber base material, and the disposing step includes disposing the fiber base material on the mold surface with the sheet sandwiched in between.

With the fiber-reinforced composite material molding method of this configuration, the fiber base material is disposed on the mold surface with the releasable sheet sandwiched in between, and thus the resin material having the shape of the second groove portion attached to the product obtained by the molding can be easily removed by removing the sheet from the product obtained by the molding.

Preferably, in the fiber-reinforced composite material molding method having the above-described configuration, the molding die includes a first molding surface on which a first fiber base material having a first width along a width direction orthogonal to the first direction is disposed, a second molding surface on which a second fiber base material having a second width greater than the first width along the width direction is disposed, and a wall portion that extends along the first direction and through which the first molding surface is connected to the second molding surface, a third groove portion extending along the second direction is formed in the second molding surface, the wall portion is formed to be flat over an entire region in the first direction, the method further comprises an attaching step of attaching a first sheet on a region other than a region of the first fiber base material facing the wall portion, and attaching a second sheet on the second fiber base material, and the disposing step includes disposing the first fiber base material on the first molding surface with the first sheet sandwiched in between, and disposing the second fiber base material on the second molding surface with the second sheet sandwiched in between.

In the attaching step, a releasable sheet is attached to the fiber base material, so that the resin material injected into the second groove portions and attached to the product obtained by the molding can be easily removed from the product. The releasable sheet provides the advantage that the resin material attached to the product can be easily removed from the product, but the quality of the molded product is compromised if the sheet enters between the first fiber base material and the second fiber base material. Thus, to prevent the entrance of the releasable sheet between the first fiber base material and the second fiber base material, the releasable sheet is preferably attached to a region other than a region of the first fiber base material facing the wall portion.

Thus, in the fiber-reinforced composite material molding method of this configuration, the first sheet is attached to a region other than a region of the first fiber base material facing the wall portion. In this case, when a groove portion through which the resin material enters into the wall portion is provided, the resin material injected into the groove portion attaches to the product obtained by the molding, to compromise the quality of the product obtained by the molding. Therefore, with the fiber-reinforced composite material molding method of this configuration, the wall portion is formed to be flat over the entire region in the first direction.

With the fiber-reinforced composite material molding method of this configuration, with the wall portion having the flat shape, the resin material with a shape of the groove portion does not attach to the fiber base material facing the wall portion, whereby the quality of the product obtained by the molding can be prevented from being compromised. Even when the wall portion has a flat shape, the resin material flows in a gap between the fiber base material and the wall portion, so that the resin material that has reached the wall portion through the second groove portions can be guided to the third groove portion.

Preferably, in the fiber-reinforced composite material molding method having the above-described configuration, the molding die includes a first molding surface on which a first fiber base material having a first width along a width direction orthogonal to the first direction is disposed, a second molding surface on which a second fiber base material having a second width greater than the first width along the width direction is disposed, and a wall portion that extends along the first direction and through which the first molding surface is connected to the second molding surface, a third groove portion extending along the second direction is formed in the second molding surface, the wall portion includes a connection groove through which the second groove portions are connected to the third groove portion, the method further comprises an attaching step of attaching a first sheet on the first fiber base material to cover a region facing the wall portion, and attaching a second sheet on the second fiber base material, and the disposing step includes disposing the first fiber base material on the first molding surface with the first sheet sandwiched in between, and disposing the second fiber base material on the second molding surface with the second sheet sandwiched in between.

In the attaching step, a releasable sheet is attached to the fiber base material, so that the resin material injected into the second groove portions and attached to the product obtained by the molding can be easily removed from the product. The releasable sheet provides the advantage that the resin material attached to the product can be easily removed from the product, but the quality of the molded product is compromised if the sheet enters between the first fiber base material and the second fiber base material. Thus, with the fiber-reinforced composite material molding method of this configuration, to prevent the entrance of the releasable sheet between the first fiber base material and the second fiber base material, the releasable sheet is attached to the first fiber base material to cover the region facing the wall portion.

With the fiber-reinforced composite material molding method of this configuration, the wall portion has the connection groove, so that the resin material that has flowed into the second groove portions from the first groove portion can flow into the third groove portion to be sufficiently diffused in the surface of the second fiber base material. With the releasable sheet covering the region facing the wall portion, even when the resin material injected into the connection groove is attached to the product obtained by the molding, the resin material can be easily removed by removing the sheet.

Preferably, in the fiber-reinforced composite material molding method having the above-described configuration, the molding die includes a first molding surface on which a first fiber base material having a first width along a width direction orthogonal to the first direction is disposed, a second molding surface on which a second fiber base material having a second width greater than the first width along the width direction is disposed, and a wall portion that extends along the first direction and through which the first molding surface is connected to the second molding surface, a third groove portion extending along the second direction is formed in the second molding surface, the wall portion includes a connection groove through which the second groove portions are connected to the third groove portion, the method further comprises an attaching step of attaching a first sheet on a region other than a region of the first fiber base material facing the wall portion, attaching a second sheet on the second fiber base material, and adhering an adhesive tape to the first fiber base material and the second fiber base material to cover the region facing the wall portion, and the disposing step includes disposing the first fiber base material on the first molding surface with the first sheet sandwiched in between, and disposing the second fiber base material on the second molding surface with the second sheet sandwiched in between.

In the attaching step, a releasable sheet is attached to the fiber base material, so that the resin material injected into the second groove portions and attached to the product obtained by the molding can be easily removed from the product. The releasable sheet provides the advantage that the resin material attached to the product can be easily removed from the product, but the quality of the molded product is compromised if the sheet enters between the first fiber base material and the second fiber base material. Thus, with the fiber-reinforced composite material molding method of this configuration, to prevent the entrance of the releasable sheet between the first fiber base material and the second fiber base material, the adhesive tape is adhered to the first fiber base material and the second fiber base material to cover the region facing the wall portion.

With the fiber-reinforced composite material molding method of this configuration, the wall portion has the connection groove, so that the resin material that has flowed into the second groove portions from the first groove portion can flow into the third groove portion to be sufficiently diffused in the surface of the second fiber base material. With the adhesive tape covering the region facing the wall portion, even when the resin material injected into the connection groove is attached to the product obtained by the molding, the resin material can be easily removed by removing the tape. With the adhesive tape adhered to the first fiber base material and the second fiber base material, the tape is prevented from entering between the first fiber base material and the second fiber base material during the molding process.

The invention claimed is:

1. A fiber-reinforced composite material molding method for molding a composite material by using a molding die, the molding die including:
    a main body portion including a first groove portion that extends along a first direction, second groove portions that are formed at a plurality of positions in the first direction and extend along a second direction crossing the first direction, and a step portion that extends along the first direction and is disposed between the first groove portion and the second groove portions; and a lid portion that extends along the first direction, is disposed being in contact with the step portion to cover the first groove portion, and forms a part of a molding surface for molding a fiber base material, either the main body portion or the lid portion including a communication groove through which the first groove portion and is communicated with the second groove portions, the fiber-reinforced composite material molding method, comprising:

a disposing step of disposing the fiber base material on the molding surface with a releasable sheet sandwiched in between;

a hermetically sealing step of sealing the fiber base material in the molding die by using a hermetically sealing member to form a hermetically sealed space; and an injecting step of intaking air in the hermetically sealed space formed by the hermetically sealing step to depressurize the hermetically sealed space and injecting a resin material into the first groove portion, wherein the molding die includes a first molding surface on which a first fiber base material having a first width along a width direction orthogonal to the first direction is disposed, a second molding surface on which a second fiber base material having a second width greater than the first width along the width direction is disposed, and a wall portion that extends along the first direction and is configured to connect the first molding surface with the second molding surface, and a third groove portion extending along the second direction being formed in the second molding surface, the wall portion being formed to be flat over an entire region in the first direction, the fiber-reinforced composite material molding method further comprises an attaching step of attaching a first sheet on a region other than a region of the first fiber base material facing the wall portion and attaching a second sheet on the second fiber base material, wherein the disposing step includes disposing the first fiber base material on the first molding surface with the first sheet sandwiched in between and disposing the second fiber base material on the second molding surface with the second sheet sandwiched in between.

2. A fiber-reinforced composite material molding method for molding a composite material by using a molding die, the molding die including:

a main body portion including a first groove portion that extends along a first direction, second groove portions that are formed at a plurality of positions in the first direction and extend along a second direction crossing the first direction, and a step portion that extends along the first direction and is disposed between the first groove portion and the second groove portions; and a lid portion that extends along the first direction, is disposed being in contact with the step portion to cover the first groove portion, and forms a part of a molding surface for molding a fiber base material, either the main body portion or the lid portion including a communication groove through which the first groove portion and is communicated with the second groove portions, the fiber-reinforced composite material molding method, comprising:

a disposing step of disposing the fiber base material on the molding surface with a releasable sheet sandwiched in between;

a hermetically sealing step of sealing the fiber base material in the molding die by using a hermetically sealing member to form a hermetically sealed space; and an injecting step of intaking air in the hermetically sealed space formed by the hermetically sealing step to depressurize the hermetically sealed space and injecting a resin material into the first groove portion, wherein the molding die includes a first molding surface on which a first fiber base material having a first width along a width direction orthogonal to the first direction is disposed, a second molding surface on which a second fiber base material having a second width greater than the first width along the width direction is disposed, and a wall portion that extends along the first direction and is configured to connect the first molding surface with the second molding surface, and a third groove portion extending along the second direction being formed in the second molding surface, the wall portion including a connection groove through which the second groove portions are connected to the third groove portion, the fiber-reinforced composite material molding method further comprises an attaching step of attaching a first sheet on the first fiber base material to cover a region facing the wall portion and attaching a second sheet on the second fiber base material, wherein the disposing step includes disposing the first fiber base material on the first molding surface with the first sheet sandwiched in between and disposing the second fiber base material on the second molding surface with the second sheet sandwiched in between.

3. A fiber-reinforced composite material molding method for molding a composite material by using a molding die, the molding die including:

a main body portion including a first groove portion that extends along a first direction, second groove portions that are formed at a plurality of positions in the first direction and extend along a second direction crossing the first direction, and a step portion that extends along the first direction and is disposed between the first groove portion and the second groove portions; and a lid portion that extends along the first direction, is disposed being in contact with the step portion to cover the first groove portion, and forms a part of a molding surface for molding a fiber base material, either the main body portion or the lid portion including a communication groove through which the first groove portion and is communicated with the second groove portions, the fiber-reinforced composite material molding method, comprising:

a disposing step of disposing the fiber base material on the molding surface with a releasable sheet sandwiched in between;

a hermetically sealing step of sealing the fiber base material in the molding die by using a hermetically sealing member to form a hermetically sealed space; and an injecting step of intaking air in the hermetically sealed space formed by the hermetically sealing step to depressurize the hermetically sealed space and injecting a resin material into the first groove portion, wherein the molding die includes a first molding surface on which a first fiber base material having a first width along a width direction orthogonal to the first direction is disposed, a second molding surface on which a second fiber base material having a second width greater than the first width along the width direction is disposed, and a wall portion that extends along the first direction and is configured to connect the first molding surface with the second molding surface, and a third groove portion extending along the second direction being formed in the second molding surface, the wall portion including a connection groove through which the second groove portions are connected to the third groove portion, the fiber-reinforced composite material molding method further comprises an attaching step of attaching a first sheet on a region other than a region of the first fiber base material facing the wall portion, attaching a second sheet on the second fiber base material, and adhering an adhesive tape to the first fiber base material and the second fiber base material to cover the region facing the wall portion, wherein the disposing step includes disposing the first fiber base material on the first molding surface with the first sheet sandwiched in between and disposing the second fiber base material on the second molding surface with the second sheet sandwiched in between.

* * * * *